(12) United States Patent
Schlebusch et al.

(10) Patent No.: US 12,478,267 B2
(45) Date of Patent: Nov. 25, 2025

(54) SENSOR HEAD DEVICE FOR A MINIMAL INVASIVE VENTRICULAR ASSIST DEVICE AND METHOD FOR PRODUCING SUCH A SENSOR HEAD DEVICE

(71) Applicant: KARDION GMBH, Stuttgart (DE)

(72) Inventors: Thomas Alexander Schlebusch, Renningen (DE); Julian Kassel, Böblingen (DE)

(73) Assignee: Kardion GmbH, Stuttgart (DE)

( * ) Notice: Subject to any disclaimer, the term of this patent is extended or adjusted under 35 U.S.C. 154(b) by 1061 days.

(21) Appl. No.: 15/734,036

(22) PCT Filed: Jun. 6, 2019

(86) PCT No.: PCT/EP2019/064780
§ 371 (c)(1),
(2) Date: Jun. 8, 2021

(87) PCT Pub. No.: WO2019/234149
PCT Pub. Date: Dec. 12, 2019

(65) Prior Publication Data
US 2021/0290087 A1      Sep. 23, 2021

(30) Foreign Application Priority Data

Jun. 6, 2018   (DE) .................. 102018208892.6

(51) Int. Cl.
*A61B 5/00*   (2006.01)
*A61B 5/01*   (2006.01)
(Continued)

(52) U.S. Cl.
CPC ............ *A61B 5/02158* (2013.01); *A61B 5/01* (2013.01); *A61B 5/026* (2013.01); *A61B 5/6852* (2013.01);
(Continued)

(58) Field of Classification Search
CPC ....... A61B 5/02158; A61B 5/01; A61B 5/026; A61B 5/6852; A61B 5/686;
(Continued)

(56) References Cited

U.S. PATENT DOCUMENTS 3,088,323 A   5/1963   Welkowitz et al.
4,023,562 A   5/1977   Hynecek et al.
(Continued)

FOREIGN PATENT DOCUMENTS

CA   3 122 415   7/2020
CN   1192351 A   9/1998
(Continued)

OTHER PUBLICATIONS

Lombardi et al., "Flow Rate Profiler: an instrument to measure blood velocity profiles", Ultrasonics, 2001, vol. 39, pp. 143-150.
(Continued)

*Primary Examiner* — Carl H Layno
*Assistant Examiner* — Anh-Khoa N Dinh
(74) *Attorney, Agent, or Firm* — Knobbe, Martens, Olson & Bear, LLP

(57) ABSTRACT

The invention relates to a sensor head device for a heart support system, wherein the sensor head device has at least one sensor carrying element, wherein the sensor carrying element has at least one sensor cavity for accommodating at least one sensor and/or at least one signal transmitter cavity for accommodating at least one signal transmitter.

18 Claims, 5 Drawing Sheets

(51) Int. Cl.
*A61B 5/0215* (2006.01)
*A61B 5/026* (2006.01)

(52) U.S. Cl.
CPC ...... *A61B 5/686* (2013.01); *A61B 2562/0247* (2013.01); *A61B 2562/0271* (2013.01); *A61B 2562/06* (2013.01); *A61B 2562/12* (2013.01)

(58) Field of Classification Search
CPC .... A61B 2562/0247; A61B 2562/0271; A61B 2562/06; A61B 2562/12; A61B 5/024; A61B 2562/0261; A61B 5/14542; A61B 3/102; A61B 3/12; A61B 3/1241; A61B 3/14; A61B 3/16; A61B 3/165; A61B 5/0077; A61B 5/0205; A61B 5/021; A61B 5/0215; A61B 5/031; A61B 5/055; A61B 5/1032; A61B 5/1077; A61B 5/1116; A61B 5/6803; A61B 5/6898; A61B 6/50; A61B 8/10

See application file for complete search history.

(56) References Cited

U.S. PATENT DOCUMENTS

| | | |
|---|---|---|
| 4,559,952 A | 12/1985 | Angelsen et al. |
| 4,680,730 A | 7/1987 | Omoda |
| 4,781,525 A | 11/1988 | Hubbard et al. |
| 4,888,011 A | 12/1989 | Kung et al. |
| 4,889,131 A | 12/1989 | Salem et al. |
| 4,902,272 A | 2/1990 | Milder et al. |
| 5,045,051 A | 9/1991 | Milder et al. |
| 5,269,811 A | 12/1993 | Hayes |
| 5,289,821 A | 3/1994 | Swartz |
| 5,456,715 A | 10/1995 | Liotta |
| 5,527,159 A | 6/1996 | Bozeman, Jr. et al. |
| 5,581,038 A | 12/1996 | Lampropoulos |
| 5,613,935 A | 3/1997 | Jarvik |
| 5,662,115 A | 9/1997 | Torp |
| 5,676,651 A | 10/1997 | Larson, Jr. et al. |
| 5,720,771 A | 2/1998 | Snell |
| 5,752,976 A | 5/1998 | Duffin et al. |
| 5,766,207 A | 6/1998 | Potter et al. |
| 5,827,203 A | 10/1998 | Nita |
| 5,865,759 A | 2/1999 | Koblanski |
| 5,888,242 A | 3/1999 | Antaki et al. |
| 5,904,708 A | 5/1999 | Goedeke |
| 5,911,685 A | 6/1999 | Siess et al. |
| 5,964,694 A | 10/1999 | Siess et al. |
| 5,980,465 A | 11/1999 | Elgas |
| 6,007,478 A | 12/1999 | Siess et al. |
| 6,024,704 A | 2/2000 | Meador et al. |
| 6,053,873 A | 4/2000 | Govari et al. |
| 6,167,765 B1 | 1/2001 | Weitzel |
| 6,176,822 B1 | 1/2001 | Nix et al. |
| 6,183,412 B1 | 2/2001 | Benkowsi et al. |
| 6,185,460 B1 | 2/2001 | Thompson |
| 6,190,324 B1 | 2/2001 | Kieval et al. |
| 6,210,318 B1 | 4/2001 | Lederman |
| 6,231,498 B1 | 5/2001 | Pfeiffer et al. |
| 6,245,007 B1 | 6/2001 | Bedingham et al. |
| 6,314,322 B1 | 11/2001 | Rosenberg |
| 6,351,048 B1 | 2/2002 | Schob et al. |
| 6,398,734 B1 | 6/2002 | Cimochowski et al. |
| 6,432,136 B1 | 8/2002 | Weiss et al. |
| 6,438,409 B1 | 8/2002 | Malik et al. |
| 6,512,949 B1 | 1/2003 | Combs et al. |
| 6,530,876 B1 | 3/2003 | Spence |
| 6,540,658 B1 | 4/2003 | Fasciano et al. |
| 6,540,659 B1 | 4/2003 | Milbocker |
| 6,561,975 B1 | 5/2003 | Pool et al. |
| 6,579,257 B1 | 6/2003 | Elgas et al. |
| 6,602,182 B1 | 8/2003 | Milbocker |
| 6,605,032 B2 | 8/2003 | Benkowsi et al. |
| 6,652,447 B2 | 11/2003 | Benkowsi et al. |
| 6,731,976 B2 | 5/2004 | Penn et al. |
| 6,879,126 B2 | 4/2005 | Paden et al. |
| 6,912,423 B2 | 6/2005 | Ley et al. |
| 6,949,066 B2 | 9/2005 | Bearnson et al. |
| 6,984,201 B2 | 1/2006 | Khaghani et al. |
| 7,010,954 B2 | 3/2006 | Siess |
| 7,022,100 B1 | 4/2006 | Aboul-Hosn et al. |
| 7,024,244 B2 | 4/2006 | Muhlenberg et al. |
| 7,070,555 B2 | 7/2006 | Siess |
| 7,083,588 B1 | 8/2006 | Shmulewitz et al. |
| 7,138,776 B1 | 11/2006 | Gauthier et al. |
| 7,160,243 B2 | 1/2007 | Medvedev |
| 7,175,588 B2 | 2/2007 | Morello |
| 7,177,681 B2 | 2/2007 | Xhu |
| 7,238,151 B2 | 7/2007 | Frazier |
| 7,396,327 B2 | 7/2008 | Morello |
| 7,513,864 B2 | 4/2009 | Kantrowitz et al. |
| 7,520,850 B2 | 4/2009 | Brockway |
| 7,526,338 B1 | 4/2009 | Gill |
| 7,527,599 B2 | 5/2009 | Hickey |
| 7,591,777 B2 | 9/2009 | LaRose |
| 7,744,560 B2 | 6/2010 | Struble |
| 7,794,384 B2 | 9/2010 | Sugiura et al. |
| 7,819,916 B2 | 10/2010 | Yaegashi |
| 7,850,593 B2 | 12/2010 | Vincent et al. |
| 7,850,594 B2 | 12/2010 | Sutton et al. |
| 7,856,335 B2 | 12/2010 | Morello et al. |
| 7,862,501 B2 | 1/2011 | Woodward et al. |
| 7,951,062 B2 | 5/2011 | Morello |
| 7,951,129 B2 | 5/2011 | Chinchoy |
| 7,963,905 B2 | 6/2011 | Salmonsen et al. |
| 7,988,728 B2 | 8/2011 | Ayre |
| 8,075,472 B2 | 12/2011 | Zilbershlag et al. |
| 8,190,390 B2 | 5/2012 | Morello et al. |
| 8,211,028 B2 | 7/2012 | Karamanoglu et al. |
| 8,303,482 B2 | 11/2012 | Schima et al. |
| 8,323,173 B2 | 12/2012 | Benkowsi et al. |
| 8,435,182 B1 | 5/2013 | Tamura |
| 8,449,444 B2 | 5/2013 | Poirier |
| 8,545,380 B2 | 10/2013 | Farnan et al. |
| 8,585,572 B2 | 11/2013 | Mehmanesh |
| 8,591,393 B2 | 11/2013 | Walters et al. |
| 8,594,790 B2 | 11/2013 | Kjellstrom et al. |
| 8,622,949 B2 | 1/2014 | Zafirelis et al. |
| 8,657,733 B2 | 2/2014 | Ayre et al. |
| 8,657,875 B2 | 2/2014 | Kung et al. |
| 8,715,151 B2 | 5/2014 | Poirier |
| 8,747,293 B2 | 6/2014 | Arndt et al. |
| 8,849,398 B2 | 9/2014 | Evans |
| 8,864,643 B2 | 10/2014 | Reichenbach et al. |
| 8,864,644 B2 | 10/2014 | Yomtov |
| 8,876,685 B2 | 11/2014 | Crosby et al. |
| 8,882,477 B2 | 11/2014 | Fritz, IV et al. |
| 8,888,728 B2 | 11/2014 | Aboul-Hosn et al. |
| 8,897,873 B2 | 11/2014 | Schima et al. |
| 8,903,492 B2 | 12/2014 | Soykan et al. |
| 9,091,271 B2 | 7/2015 | Bourque |
| 9,297,735 B2 | 3/2016 | Graichen et al. |
| 9,308,305 B2 | 4/2016 | Chen et al. |
| 9,345,824 B2 | 5/2016 | Mohl et al. |
| 9,371,826 B2 | 6/2016 | Yanai et al. |
| 9,427,508 B2 | 8/2016 | Reyes et al. |
| 9,427,509 B2 | 8/2016 | Vodermayer |
| 9,474,840 B2 | 10/2016 | Siess |
| 9,492,601 B2 | 11/2016 | Casas et al. |
| 9,511,179 B2 | 12/2016 | Casas et al. |
| 9,555,173 B2 | 1/2017 | Spanier |
| 9,555,175 B2 | 1/2017 | Bulent et al. |
| 9,556,873 B2 | 1/2017 | Yanai et al. |
| 9,566,374 B2 | 2/2017 | Spence et al. |
| 9,636,442 B2 | 5/2017 | Karmon et al. |
| 9,656,010 B2 | 5/2017 | Burke |
| 9,669,142 B2 | 6/2017 | Spanier et al. |
| 9,669,144 B2 | 6/2017 | Spanier et al. |
| 9,694,123 B2 | 7/2017 | Bourque et al. |
| 9,713,701 B2 | 7/2017 | Sarkar et al. |
| 9,744,282 B2 | 8/2017 | Rosenberg et al. |
| 9,789,236 B2 | 10/2017 | Bonde |
| 9,833,550 B2 | 12/2017 | Siess |
| 9,848,899 B2 | 12/2017 | Sliwa et al. |

(56) References Cited

U.S. PATENT DOCUMENTS

| | | |
|---|---|---|
| 9,849,224 B2 | 12/2017 | Angwin et al. |
| 9,878,087 B2 | 1/2018 | Richardson et al. |
| 9,943,236 B2 | 4/2018 | Bennett et al. |
| 9,950,102 B2 | 4/2018 | Spence et al. |
| 9,974,894 B2 | 5/2018 | Morello |
| 9,999,714 B2 | 6/2018 | Spanier et al. |
| 10,010,662 B2 | 7/2018 | Wiesener et al. |
| 10,022,480 B2 | 7/2018 | Greatrex et al. |
| 10,029,037 B2 | 7/2018 | Muller et al. |
| 10,052,420 B2 | 8/2018 | Medvedev et al. |
| 10,279,093 B2 | 5/2019 | Reichenbach et al. |
| 10,322,217 B2 | 6/2019 | Spence |
| 10,342,906 B2 | 7/2019 | D'Ambrosio et al. |
| 10,350,342 B2 | 7/2019 | Thomas et al. |
| 10,357,598 B2 | 7/2019 | Aboul-Hosn et al. |
| 10,376,162 B2 | 8/2019 | Edelman et al. |
| 10,413,651 B2 | 9/2019 | Yomtov et al. |
| 10,426,879 B2 | 10/2019 | Farnan |
| 10,449,275 B2 | 10/2019 | Corbett |
| 10,500,322 B2 | 12/2019 | Karch |
| 10,525,178 B2 | 1/2020 | Zeng |
| 10,549,020 B2 | 2/2020 | Spence et al. |
| 10,561,771 B2 | 2/2020 | Heilman et al. |
| 10,561,772 B2 | 2/2020 | Schumacher |
| 10,561,773 B2 | 2/2020 | Ferrari et al. |
| 10,632,241 B2 | 4/2020 | Schenck et al. |
| 10,660,998 B2 | 5/2020 | Hodges |
| 10,668,195 B2 | 6/2020 | Flores |
| 10,732,583 B2 | 8/2020 | Rudser |
| 10,857,275 B2 | 12/2020 | Granegger |
| 10,864,308 B2 | 12/2020 | Muller et al. |
| 11,027,114 B2 | 6/2021 | D'Ambrosio et al. |
| RE48,649 E | 7/2021 | Siess |
| 11,067,085 B2 | 7/2021 | Granegger et al. |
| 11,120,908 B2 | 9/2021 | Agnello et al. |
| 11,131,968 B2 | 9/2021 | Rudser |
| 11,147,960 B2 | 10/2021 | Spanier et al. |
| 11,154,701 B2 | 10/2021 | Reyes et al. |
| 11,154,702 B2 | 10/2021 | Kadrolkar et al. |
| 11,185,682 B2 | 11/2021 | Farnan |
| 11,191,945 B2 | 12/2021 | Siess et al. |
| 11,197,618 B2 | 12/2021 | Edelman et al. |
| 11,217,344 B2 | 1/2022 | Agnello |
| 11,235,139 B2 | 2/2022 | Kudlik |
| 11,241,572 B2 | 2/2022 | Dague et al. |
| 11,273,299 B2 | 3/2022 | Wolman et al. |
| 11,285,310 B2 | 3/2022 | Curran et al. |
| 11,285,311 B2 | 3/2022 | Siess et al. |
| 11,298,524 B2 | 4/2022 | El Katerji et al. |
| 11,311,711 B2 | 4/2022 | Casas et al. |
| 11,316,679 B2 | 4/2022 | Agnello |
| 11,320,382 B2 | 5/2022 | Aikawa |
| 11,324,395 B2 | 5/2022 | Banik et al. |
| 11,331,082 B2 | 5/2022 | Itoh et al. |
| 11,337,724 B2 | 5/2022 | Masubuchi et al. |
| 11,338,125 B2 | 5/2022 | Liu et al. |
| 11,351,356 B2 | 6/2022 | Mohl |
| 11,351,357 B2 | 6/2022 | Mohl |
| 11,351,358 B2 | 6/2022 | Nix et al. |
| 11,357,438 B2 | 6/2022 | Stewart et al. |
| 11,357,968 B2 | 6/2022 | El Katerji et al. |
| 11,376,415 B2 | 7/2022 | Mohl |
| 11,376,419 B2 | 7/2022 | Reyes et al. |
| 11,389,639 B2 | 7/2022 | Casas |
| 11,389,641 B2 | 7/2022 | Nguyen et al. |
| 11,413,444 B2 | 8/2022 | Nix et al. |
| 11,413,445 B2 | 8/2022 | Brown et al. |
| 11,420,041 B2 | 8/2022 | Karch |
| 11,439,806 B2 | 9/2022 | Kimball et al. |
| 11,446,481 B2 | 9/2022 | Wolman et al. |
| 11,478,629 B2 | 10/2022 | Harjes et al. |
| 11,517,740 B2 | 12/2022 | Agarwa et al. |
| 11,521,723 B2 | 12/2022 | Liu et al. |
| 11,524,165 B2 | 12/2022 | Tan et al. |
| 11,527,322 B2 | 12/2022 | Agnello et al. |
| 11,529,062 B2 | 12/2022 | Moyer et al. |
| 11,554,260 B2 | 1/2023 | Reyes et al. |
| 11,572,879 B2 | 2/2023 | Mohl |
| 11,574,741 B2 | 2/2023 | Tan et al. |
| 11,577,068 B2 | 2/2023 | Spence et al. |
| 11,581,083 B2 | 2/2023 | El Katerji et al. |
| 11,583,659 B2 | 2/2023 | Pfeffer et al. |
| 11,587,337 B2 | 2/2023 | Lemay et al. |
| 11,590,337 B2 | 2/2023 | Granegger et al. |
| 11,622,695 B1 | 4/2023 | Adriola et al. |
| 11,628,293 B2 | 4/2023 | Gandhi et al. |
| 11,639,722 B2 | 5/2023 | Medvedev et al. |
| 11,648,386 B2 | 5/2023 | Poirer |
| 11,653,841 B2 | 5/2023 | Reyes et al. |
| 11,666,746 B2 | 6/2023 | Ferrari et al. |
| 11,668,321 B2 | 6/2023 | Richert et al. |
| 11,674,517 B2 | 6/2023 | Mohl |
| 11,676,718 B2 | 6/2023 | Agnello et al. |
| 11,684,276 B2 | 6/2023 | Cros et al. |
| 11,684,769 B2 | 6/2023 | Harjes et al. |
| 11,694,539 B2 | 7/2023 | Kudlik et al. |
| 11,694,813 B2 | 7/2023 | El Katerji et al. |
| 11,696,782 B2 | 7/2023 | Carlson et al. |
| 11,707,617 B2 | 7/2023 | Reyes et al. |
| 11,712,167 B2 | 8/2023 | Medvedev et al. |
| 11,724,091 B2 | 8/2023 | Siess et al. |
| 11,754,077 B1 | 9/2023 | Mohl |
| D1,001,145 S | 10/2023 | Lussier et al. |
| D1,001,146 S | 10/2023 | Lussier et al. |
| 11,771,885 B2 | 10/2023 | Liu et al. |
| 11,779,234 B2 | 10/2023 | Harjes et al. |
| 11,781,551 B2 | 10/2023 | Yanai et al. |
| 11,790,487 B2 | 10/2023 | Barbato et al. |
| 11,793,994 B2 | 10/2023 | Josephy et al. |
| 11,806,116 B2 | 11/2023 | Tuval et al. |
| 11,806,517 B2 | 11/2023 | Petersen |
| 11,806,518 B2 | 11/2023 | Michelena et al. |
| 11,813,079 B2 | 11/2023 | Lau et al. |
| 11,818,782 B2 | 11/2023 | Doudian et al. |
| 11,824,381 B2 | 11/2023 | Conyers et al. |
| 11,826,127 B2 | 11/2023 | Casas |
| 11,832,793 B2 | 12/2023 | McWeeney et al. |
| 11,832,868 B2 | 12/2023 | Smail et al. |
| 11,837,364 B2 | 12/2023 | Lee et al. |
| 11,844,592 B2 | 12/2023 | Tuval et al. |
| 11,844,940 B2 | 12/2023 | D'Ambrosio et al. |
| 11,850,073 B2 | 12/2023 | Wright et al. |
| 11,850,414 B2 | 12/2023 | Schenck et al. |
| 11,850,415 B2 | 12/2023 | Schwammenthal et al. |
| D1,012,284 S | 1/2024 | Glaser et al. |
| 11,857,345 B2 | 1/2024 | Hanson et al. |
| 11,864,878 B2 | 1/2024 | Duval et al. |
| 11,872,384 B2 | 1/2024 | Cotter |
| 11,883,207 B2 | 1/2024 | El Katerji et al. |
| D1,014,552 S | 2/2024 | Lussier et al. |
| 11,890,082 B2 | 2/2024 | Cros et al. |
| 11,896,199 B2 | 2/2024 | Lent et al. |
| 11,900,660 B2 | 2/2024 | Saito et al. |
| 11,903,657 B2 | 2/2024 | Geric et al. |
| 11,906,411 B2 | 2/2024 | Graichen et al. |
| 11,911,550 B2 | 2/2024 | Itamochi et al. |
| D1,017,634 S | 3/2024 | Lussier et al. |
| D1,017,699 S | 3/2024 | Moore et al. |
| 11,923,078 B2 | 3/2024 | Fallen et al. |
| 11,923,093 B2 | 3/2024 | Moffitt et al. |
| 11,925,794 B2 | 3/2024 | Malkin et al. |
| 11,931,073 B2 | 3/2024 | Walsh et al. |
| 11,931,528 B2 | 3/2024 | Rohl et al. |
| 11,931,588 B2 | 3/2024 | Aghassian |
| 11,986,274 B2 | 5/2024 | Edelman |
| 12,017,076 B2 | 6/2024 | Tan et al. |
| 12,023,476 B2 | 7/2024 | Tuval et al. |
| 12,029,891 B2 | 7/2024 | Siess et al. |
| 12,059,559 B2 | 8/2024 | Muller et al. |
| D1,043,730 S | 9/2024 | Lussier et al. |
| D1,043,731 S | 9/2024 | Lussier et al. |
| 12,076,544 B2 | 9/2024 | Siess et al. |
| 12,097,016 B2 | 9/2024 | Goldvasser |
| 12,102,815 B2 | 10/2024 | Dhaliwal et al. |

(56) References Cited

U.S. PATENT DOCUMENTS

| | | |
|---|---|---|
| 12,144,650 B2 | 11/2024 | Spanier et al. |
| 12,144,976 B2 | 11/2024 | Baumbach et al. |
| 12,178,554 B2 | 12/2024 | Stotz et al. |
| 12,179,009 B2 | 12/2024 | El Katerji et al. |
| 12,183,459 B2 | 12/2024 | Agnello et al. |
| 12,194,287 B2 | 1/2025 | Kassel et al. |
| 12,201,821 B2 | 1/2025 | Schlebusch et al. |
| 12,211,615 B2 | 1/2025 | Nix et al. |
| D1,060,379 S | 2/2025 | Lussier et al. |
| 12,213,771 B2 | 2/2025 | Curran et al. |
| 12,217,850 B2 | 2/2025 | Agnello |
| 12,222,267 B2 | 2/2025 | Stotz et al. |
| 12,251,551 B2 | 3/2025 | Liu et al. |
| 12,257,424 B2 | 3/2025 | Schlebusch et al. |
| 12,268,861 B2 | 4/2025 | D'Ambrosio et al. |
| 12,296,158 B2 | 5/2025 | Higgins et al. |
| 12,296,159 B2 | 5/2025 | Schilling et al. |
| 12,310,621 B2 | 5/2025 | Murphy |
| 12,310,708 B2 | 5/2025 | Schlebusch et al. |
| 12,311,160 B2 | 5/2025 | Schlebusch et al. |
| 12,324,906 B2 | 6/2025 | Baumbach et al. |
| 12,329,501 B2 | 6/2025 | Moyer et al. |
| 12,329,956 B2 | 6/2025 | Sunagawa |
| 12,329,959 B2 | 6/2025 | Hassan et al. |
| 12,343,518 B2 | 7/2025 | Tuval et al. |
| 2001/0016686 A1 | 8/2001 | Okada et al. |
| 2001/0037093 A1 | 11/2001 | Benkowski et al. |
| 2001/0039828 A1 | 11/2001 | Shin et al. |
| 2002/0022785 A1 | 2/2002 | Romano |
| 2002/0082585 A1 | 6/2002 | Carroll et al. |
| 2002/0093412 A1 | 7/2002 | Morrison |
| 2002/0147495 A1 | 10/2002 | Petroff |
| 2002/0151761 A1 | 10/2002 | Viole et al. |
| 2003/0069465 A1 | 4/2003 | Benkowski et al. |
| 2003/0130581 A1 | 7/2003 | Salo et al. |
| 2003/0139643 A1 | 7/2003 | Smith et al. |
| 2003/0167002 A1 | 9/2003 | Nagar et al. |
| 2003/0191357 A1 | 10/2003 | Frazier |
| 2003/0199727 A1 | 10/2003 | Burke |
| 2004/0022640 A1 | 2/2004 | Siess et al. |
| 2004/0044266 A1 | 3/2004 | Siess et al. |
| 2004/0065143 A1 | 4/2004 | Husher |
| 2004/0124979 A1 | 7/2004 | Medema |
| 2004/0130009 A1 | 7/2004 | Tangpuz |
| 2004/0167376 A1 | 8/2004 | Peters et al. |
| 2004/0167410 A1 | 8/2004 | Hettrick |
| 2004/0225177 A1 | 11/2004 | Coleman et al. |
| 2004/0241019 A1 | 12/2004 | Goldowsky |
| 2004/0260346 A1 | 12/2004 | Overall et al. |
| 2005/0001324 A1 | 1/2005 | Dunn |
| 2005/0019167 A1 | 1/2005 | Nusser et al. |
| 2005/0107658 A1 | 5/2005 | Brockway |
| 2005/0126268 A1 | 6/2005 | Ouriev et al. |
| 2005/0267322 A1 | 12/2005 | LaRose |
| 2006/0030809 A1 | 2/2006 | Barzilay et al. |
| 2006/0108697 A1 | 5/2006 | Wang |
| 2006/0108901 A1 | 5/2006 | Mao-Chin et al. |
| 2006/0122583 A1 | 6/2006 | Pesach et al. |
| 2006/0196277 A1 | 9/2006 | Allen et al. |
| 2006/0229488 A1 | 10/2006 | Ayre et al. |
| 2006/0287600 A1 | 12/2006 | McEowen |
| 2006/0287604 A1 | 12/2006 | Hickey |
| 2007/0060787 A1 | 3/2007 | Peters et al. |
| 2007/0069354 A1 | 3/2007 | Dangelmaier |
| 2007/0073352 A1 | 3/2007 | Euler et al. |
| 2007/0088214 A1 | 4/2007 | Shuros et al. |
| 2007/0156006 A1 | 7/2007 | Smith et al. |
| 2007/0255352 A1 | 11/2007 | Roline et al. |
| 2007/0266778 A1 | 11/2007 | Corey et al. |
| 2007/0282209 A1 | 12/2007 | Lui et al. |
| 2007/0299325 A1 | 12/2007 | Farrell et al. |
| 2008/0015517 A1 | 1/2008 | Geistert et al. |
| 2008/0082005 A1 | 4/2008 | Stern et al. |
| 2008/0091239 A1 | 4/2008 | Johansson et al. |
| 2008/0097595 A1 | 4/2008 | Gabbay |
| 2008/0102096 A1 | 5/2008 | Molin et al. |
| 2008/0108901 A1 | 5/2008 | Baba et al. |
| 2008/0108930 A1 | 5/2008 | Weitzel et al. |
| 2008/0133006 A1 | 6/2008 | Crosby et al. |
| 2008/0146996 A1 | 6/2008 | Smisson |
| 2008/0210016 A1 | 9/2008 | Zwirn et al. |
| 2008/0248614 A1 | 10/2008 | Yang |
| 2008/0262289 A1 | 10/2008 | Goldowsky |
| 2008/0262361 A1 | 10/2008 | Gutfinger et al. |
| 2008/0269822 A1 | 10/2008 | Ljungstrom et al. |
| 2008/0275339 A1 | 11/2008 | Thiemann et al. |
| 2008/0306328 A1 | 12/2008 | Ercolani |
| 2009/0024042 A1 | 1/2009 | Nunez et al. |
| 2009/0025459 A1 | 1/2009 | Zhang et al. |
| 2009/0064755 A1 | 3/2009 | Fleischli et al. |
| 2009/0105799 A1 | 4/2009 | Hekmat et al. |
| 2009/0131765 A1 | 5/2009 | Roschak et al. |
| 2009/0204163 A1 | 8/2009 | Shuros et al. |
| 2009/0226328 A1 | 9/2009 | Morello |
| 2009/0312650 A1 | 12/2009 | Maile et al. |
| 2010/0010354 A1 | 1/2010 | Skerl et al. |
| 2010/0082099 A1 | 4/2010 | Vodermayer et al. |
| 2010/0087742 A1 | 4/2010 | Bishop et al. |
| 2010/0160801 A1 | 6/2010 | Takatani et al. |
| 2010/0219967 A1 | 9/2010 | Kaufmann |
| 2010/0222632 A1 | 9/2010 | Poirier |
| 2010/0222633 A1 | 9/2010 | Poirier |
| 2010/0222635 A1 | 9/2010 | Poirier |
| 2010/0222878 A1 | 9/2010 | Poirier |
| 2010/0268017 A1 | 10/2010 | Siess |
| 2010/0298625 A1 | 11/2010 | Reichenbach et al. |
| 2010/0324378 A1 | 12/2010 | Tran et al. |
| 2011/0004075 A1 | 1/2011 | Stahmann et al. |
| 2011/0022057 A1* | 1/2011 | Eigler ............... A61B 17/3468 606/129 |
| 2011/0071336 A1 | 3/2011 | Yomtov |
| 2011/0144744 A1 | 6/2011 | Wampler |
| 2011/0160516 A1 | 6/2011 | Dague |
| 2011/0172505 A1 | 7/2011 | Kim |
| 2011/0184301 A1 | 7/2011 | Holmstrom |
| 2011/0186943 A1 | 8/2011 | Pahl |
| 2011/0218435 A1 | 9/2011 | Srinivasan et al. |
| 2011/0230068 A1 | 9/2011 | Pahl |
| 2012/0022645 A1 | 1/2012 | Burke |
| 2012/0029408 A1 | 2/2012 | Beaudin |
| 2012/0084024 A1 | 4/2012 | Norcross, Jr. |
| 2012/0150089 A1 | 6/2012 | Penka et al. |
| 2012/0150291 A1 | 6/2012 | Aber |
| 2012/0197141 A1 | 8/2012 | Vanney |
| 2012/0203476 A1 | 8/2012 | Dam |
| 2012/0245404 A1 | 9/2012 | Smith |
| 2012/0247200 A1 | 10/2012 | Ahonen et al. |
| 2012/0310037 A1 | 12/2012 | Choi et al. |
| 2012/0330214 A1 | 12/2012 | Peters et al. |
| 2013/0041204 A1 | 2/2013 | Heilman et al. |
| 2013/0046129 A1 | 2/2013 | Medvedev et al. |
| 2013/0066141 A1 | 3/2013 | Doerr et al. |
| 2013/0066142 A1 | 3/2013 | Doerr et al. |
| 2013/0072846 A1 | 3/2013 | Heide et al. |
| 2013/0116575 A1 | 5/2013 | Mickle et al. |
| 2013/0144379 A1 | 6/2013 | Najafi et al. |
| 2013/0289334 A1 | 10/2013 | Badstibner |
| 2013/0289376 A1 | 10/2013 | Lang |
| 2013/0303831 A1 | 11/2013 | Evans |
| 2013/0304404 A1 | 11/2013 | Dam |
| 2014/0013852 A1 | 1/2014 | Brown et al. |
| 2014/0030122 A1 | 1/2014 | Ozaki |
| 2014/0100414 A1 | 4/2014 | Tamez et al. |
| 2014/0114202 A1 | 4/2014 | Hein et al. |
| 2014/0128659 A1 | 5/2014 | Heuring et al. |
| 2014/0200389 A1 | 7/2014 | Yanai et al. |
| 2014/0243688 A1 | 8/2014 | Caron et al. |
| 2014/0275720 A1 | 9/2014 | Ferrari |
| 2014/0275727 A1 | 9/2014 | Bonde |
| 2014/0296677 A1 | 10/2014 | McEowen |
| 2014/0303426 A1 | 10/2014 | Kerkhoffs et al. |
| 2014/0342203 A1 | 11/2014 | Elian |
| 2015/0032007 A1 | 1/2015 | Ottevanger et al. |
| 2015/0080743 A1 | 3/2015 | Siess |

(56) References Cited

U.S. PATENT DOCUMENTS

| | | |
|---|---|---|
| 2015/0141832 A1 | 5/2015 | Yu et al. |
| 2015/0141842 A1 | 5/2015 | Spanier et al. |
| 2015/0157216 A1 | 6/2015 | Stigall et al. |
| 2015/0174307 A1 | 6/2015 | Eckman et al. |
| 2015/0190092 A1 | 7/2015 | Mori |
| 2015/0196076 A1 | 7/2015 | Billingslea |
| 2015/0201900 A1 | 7/2015 | Syed |
| 2015/0250935 A1 | 9/2015 | Anderson et al. |
| 2015/0273184 A1 | 10/2015 | Scott et al. |
| 2015/0290372 A1 | 10/2015 | Muller et al. |
| 2015/0306290 A1* | 10/2015 | Rosenberg ............ A61B 5/0215 600/16 |
| 2015/0306291 A1 | 10/2015 | Bonde et al. |
| 2015/0307344 A1 | 10/2015 | Ernst |
| 2015/0327921 A1* | 11/2015 | Govari ................. A61B 5/0538 606/41 |
| 2015/0335804 A1 | 11/2015 | Marseille et al. |
| 2015/0365738 A1 | 12/2015 | Purvis et al. |
| 2016/0000983 A1 | 1/2016 | Mohl et al. |
| 2016/0008531 A1 | 1/2016 | Wang et al. |
| 2016/0022889 A1 | 1/2016 | Bluvshtein et al. |
| 2016/0022890 A1 | 1/2016 | Schwammenthal et al. |
| 2016/0045165 A1 | 2/2016 | Braido et al. |
| 2016/0095968 A1 | 4/2016 | Rudser |
| 2016/0101230 A1 | 4/2016 | Ochsner et al. |
| 2016/0144166 A1 | 5/2016 | Decré et al. |
| 2016/0151553 A1 | 6/2016 | Bonde |
| 2016/0166747 A1 | 6/2016 | Frazier et al. |
| 2016/0213828 A1 | 7/2016 | Sievers |
| 2016/0250399 A1 | 9/2016 | Tiller et al. |
| 2016/0278856 A1 | 9/2016 | Panescu |
| 2016/0302672 A1 | 10/2016 | Kuri |
| 2016/0303299 A1 | 10/2016 | Muller |
| 2016/0317043 A1 | 11/2016 | Campo |
| 2016/0338629 A1 | 11/2016 | Doerr |
| 2017/0010144 A1 | 1/2017 | Lenner et al. |
| 2017/0021070 A1 | 1/2017 | Petersen |
| 2017/0049945 A1 | 2/2017 | Halvorsen et al. |
| 2017/0086780 A1 | 3/2017 | Sokulin et al. |
| 2017/0098491 A1 | 4/2017 | Ziaie et al. |
| 2017/0112985 A1 | 4/2017 | Yomtov |
| 2017/0128646 A1 | 5/2017 | Karch |
| 2017/0136164 A1 | 5/2017 | Yeatts |
| 2017/0202575 A1 | 7/2017 | Stanfield et al. |
| 2017/0224279 A1 | 8/2017 | Cahan et al. |
| 2017/0239407 A1 | 8/2017 | Hayward |
| 2017/0258980 A1 | 9/2017 | Katsuki et al. |
| 2017/0348470 A1 | 12/2017 | D'Ambrosio et al. |
| 2017/0354812 A1 | 12/2017 | Callaghan et al. |
| 2018/0064860 A1 | 3/2018 | Nunez et al. |
| 2018/0078159 A1 | 3/2018 | Edelman et al. |
| 2018/0093070 A1 | 4/2018 | Cottone |
| 2018/0110910 A1 | 4/2018 | Rodemerk et al. |
| 2018/0126053 A1 | 5/2018 | Zilbershlag et al. |
| 2018/0199635 A1 | 7/2018 | Longinotti-Buitoni et al. |
| 2018/0250457 A1 | 9/2018 | Morello et al. |
| 2018/0256796 A1 | 9/2018 | Hansen |
| 2018/0256800 A1 | 9/2018 | Conyers et al. |
| 2018/0264182 A1 | 9/2018 | Spanier et al. |
| 2018/0280598 A1 | 10/2018 | Curran et al. |
| 2018/0316209 A1 | 11/2018 | Gliner |
| 2018/0326131 A1 | 11/2018 | Muller et al. |
| 2018/0333059 A1 | 11/2018 | Casas |
| 2018/0353667 A1 | 12/2018 | Moyer et al. |
| 2018/0369469 A1 | 12/2018 | Le Duc De Lillers et al. |
| 2019/0001038 A1 | 1/2019 | Yomtov et al. |
| 2019/0054223 A1 | 2/2019 | Frazier et al. |
| 2019/0083690 A1 | 3/2019 | Siess et al. |
| 2019/0192752 A1 | 6/2019 | Tiller et al. |
| 2019/0192753 A1 | 6/2019 | Liu et al. |
| 2019/0209755 A1 | 7/2019 | Nix et al. |
| 2019/0209758 A1 | 7/2019 | Tuval et al. |
| 2019/0216995 A1 | 7/2019 | Kapur et al. |
| 2019/0217002 A1 | 7/2019 | Urakabe |
| 2019/0223877 A1 | 7/2019 | Nitzen et al. |
| 2019/0240680 A1 | 8/2019 | Hayakawa |
| 2019/0254543 A1 | 8/2019 | Hartholt et al. |
| 2019/0282741 A1 | 9/2019 | Franano et al. |
| 2019/0282744 A1 | 9/2019 | D'Ambrosio et al. |
| 2019/0351117 A1 | 11/2019 | Cambronne et al. |
| 2019/0351118 A1 | 11/2019 | Graichen et al. |
| 2020/0016309 A1 | 1/2020 | Kallenbach et al. |
| 2020/0028376 A1 | 1/2020 | Ha |
| 2020/0038567 A1 | 2/2020 | Siess et al. |
| 2020/0060559 A1 | 2/2020 | Edelman et al. |
| 2020/0069857 A1 | 3/2020 | Schwammenthal et al. |
| 2020/0147283 A1 | 5/2020 | Tanner et al. |
| 2020/0164125 A1 | 5/2020 | Muller et al. |
| 2020/0164126 A1 | 5/2020 | Muller |
| 2020/0253583 A1 | 8/2020 | Brisken et al. |
| 2020/0312450 A1 | 10/2020 | Agnello et al. |
| 2021/0268264 A1 | 9/2021 | Stotz |
| 2021/0290930 A1 | 9/2021 | Kasel |
| 2021/0290933 A1 | 9/2021 | Stotz |
| 2021/0339002 A1 | 11/2021 | Schlebusch et al. |
| 2021/0339004 A1 | 11/2021 | Schlebusch et al. |
| 2021/0346674 A1 | 11/2021 | Baumbach et al. |
| 2021/0346675 A1 | 11/2021 | Schlebusch et al. |
| 2021/0346676 A1 | 11/2021 | Schlebusch et al. |
| 2021/0346677 A1 | 11/2021 | Baumbach et al. |
| 2021/0346678 A1 | 11/2021 | Baumbach et al. |
| 2021/0378523 A1 | 12/2021 | Budde |
| 2021/0379359 A1 | 12/2021 | Schellenberg |
| 2021/0379360 A1 | 12/2021 | Schellenberg |
| 2021/0393944 A1 | 12/2021 | Wenning |
| 2022/0016411 A1 | 1/2022 | Winterwerber |
| 2022/0032032 A1 | 2/2022 | Schlebusch et al. |
| 2022/0032036 A1 | 2/2022 | Baumbach et al. |
| 2022/0039669 A1 | 2/2022 | Schlebusch et al. |
| 2022/0047173 A1 | 2/2022 | Stotz et al. |
| 2022/0050037 A1 | 2/2022 | Stotz et al. |
| 2022/0072298 A1 | 3/2022 | Spanier et al. |
| 2022/0076807 A1 | 3/2022 | Agnello |
| 2022/0079457 A1 | 3/2022 | Tuval et al. |
| 2022/0105339 A1 | 4/2022 | Nix et al. |
| 2022/0126085 A1 | 4/2022 | Farnan |
| 2022/0126086 A1 | 4/2022 | Schlebusch et al. |
| 2022/0142462 A1 | 5/2022 | Douk et al. |
| 2022/0161019 A1 | 5/2022 | Mitze et al. |
| 2022/0361762 A1 | 11/2022 | Lalancette |
| 2023/0173250 A1 | 6/2023 | Stigloher |
| 2023/0191141 A1 | 6/2023 | Wenning et al. |
| 2024/0011808 A1 | 1/2024 | Winzer et al. |
| 2024/0074828 A1 | 3/2024 | Wenning |
| 2024/0245902 A1 | 7/2024 | Schlebusch et al. |
| 2025/0032773 A1 | 1/2025 | Baumbach et al. |
| 2025/0121177 A1 | 4/2025 | West |
| 2025/0143587 A1 | 5/2025 | Stotz |
| 2025/0144397 A1 | 5/2025 | Kassel et al. |
| 2025/0222247 A1 | 7/2025 | Schlebusch |
| 2025/0235687 A1 | 7/2025 | Schlebusch et al. |

FOREIGN PATENT DOCUMENTS

| | | |
|---|---|---|
| CN | 1222862 A | 7/1999 |
| CN | 1202871 C | 5/2005 |
| CN | 1661338 A | 8/2005 |
| CN | 101128168 | 2/2008 |
| CN | 101208045 | 6/2008 |
| CN | 101214158 | 7/2008 |
| CN | 101351237 | 1/2009 |
| CN | 101448535 | 6/2009 |
| CN | 101460094 | 6/2009 |
| CN | 101579233 | 11/2009 |
| CN | 201437016 | 4/2010 |
| CN | 101711683 | 5/2010 |
| CN | 201658687 | 12/2010 |
| CN | 102421372 | 4/2012 |
| CN | 102803923 | 11/2012 |
| CN | 103328018 | 9/2013 |
| CN | 103857326 | 6/2014 |
| CN | 103957957 | 7/2014 |
| CN | 104105449 | 10/2014 |
| CN | 104188687 | 12/2014 |

(56) References Cited

FOREIGN PATENT DOCUMENTS

| | | |
|---|---|---|
| CN | 106104229 | 11/2016 |
| CN | 106333707 | 1/2017 |
| CN | 206007680 | 3/2017 |
| CN | 107530479 | 1/2018 |
| CN | 107632167 | 1/2018 |
| CN | 109939282 | 6/2019 |
| CN | 209790495 | 12/2019 |
| CN | 210020563 | 2/2020 |
| CN | 215841206 | 2/2022 |
| CN | 217828630 | 11/2022 |
| CN | 219250364 | 6/2023 |
| CN | 118320294 | 7/2024 |
| CN | 113769260 | 9/2024 |
| CN | 118920928 | 11/2024 |
| DE | 195 20 920 | 12/1995 |
| DE | 198 21 307 | 10/1999 |
| DE | 100 59 714 | 5/2002 |
| DE | 100 60 275 | 6/2002 |
| DE | 101 44 269 | 3/2003 |
| DE | 102 26 305 | 10/2003 |
| DE | 10 2006 001 180 | 9/2007 |
| DE | 10 2009 007 216 | 8/2010 |
| DE | 10 2009 011 726 | 9/2010 |
| DE | 10 2009 025 464 | 1/2011 |
| DE | 10 2009 047 845 | 3/2011 |
| DE | 10 2011 106 142 | 12/2012 |
| DE | 20 2011 110 389 | 9/2013 |
| DE | 10 2015 004 177 | 10/2015 |
| DE | 10 2015 219 263 | 4/2017 |
| DE | 10 2015 222 199 | 5/2017 |
| DE | 20 2015 009 422 | 7/2017 |
| DE | 10 2012 207 042 | 9/2017 |
| DE | 10 2016 013 334 | 4/2018 |
| DE | 10 2018 208 536 | 12/2019 |
| DE | 10 2018 208 862 | 12/2019 |
| DE | 10 2018 208 916 | 12/2019 |
| DE | 10 2018 208 927 | 12/2019 |
| DE | 10 2018 208 945 | 12/2019 |
| DE | 10 2018 210 076 | 12/2019 |
| DE | 10 2018 212 153 | 1/2020 |
| DE | 10 2018 213 151 | 2/2020 |
| DE | 10 2018 213 350 | 2/2020 |
| DE | 10 2018 220 658 | 6/2020 |
| DE | 10 2018 222 505 | 6/2020 |
| DE | 10 2020 102 473 | 8/2021 |
| DE | 11 2020 003 151 | 3/2022 |
| EP | 0 794 411 | 9/1997 |
| EP | 0 916 359 | 5/1999 |
| EP | 1 062 959 | 12/2000 |
| EP | 1 339 443 | 11/2001 |
| EP | 1 011 803 | 9/2004 |
| EP | 1 354 606 | 6/2006 |
| EP | 2 143 385 | 1/2010 |
| EP | 2 175 770 | 4/2010 |
| EP | 2 187 807 | 6/2012 |
| EP | 2 570 143 | 3/2013 |
| EP | 2 401 003 | 10/2013 |
| EP | 1 871 441 | 11/2014 |
| EP | 2 859 911 | 4/2015 |
| EP | 2 213 227 | 8/2016 |
| EP | 2 835 141 | 8/2016 |
| EP | 3 088 016 | 11/2016 |
| EP | 2 585 129 | 3/2017 |
| EP | 2 945 661 | 11/2017 |
| EP | 2 136 861 | 12/2017 |
| EP | 3 020 426 | 12/2017 |
| EP | 3 287 154 | 2/2018 |
| EP | 3 205 359 | 8/2018 |
| EP | 3 205 360 | 8/2018 |
| EP | 3 378 421 | 9/2018 |
| EP | 3 389 738 | 8/2019 |
| EP | 2 505 090 | 12/2019 |
| EP | 3 668 560 | 6/2020 |
| EP | 3 720 520 | 10/2020 |
| EP | 3 753 594 | 12/2020 |
| EP | 3 357 523 | 1/2021 |
| EP | 3 490 628 | 2/2021 |
| EP | 3 487 548 | 3/2021 |
| EP | 3 509 661 | 3/2021 |
| EP | 3 515 523 | 3/2021 |
| EP | 3 528 863 | 3/2021 |
| EP | 3 615 103 | 3/2021 |
| EP | 4 271 461 | 3/2021 |
| EP | 3 131 600 | 6/2021 |
| EP | 3 131 615 | 6/2021 |
| EP | 3 463 505 | 9/2021 |
| EP | 3 884 970 | 9/2021 |
| EP | 2 599 510 | 10/2021 |
| EP | 3 003 421 | 10/2021 |
| EP | 3 027 241 | 10/2021 |
| EP | 3 668 561 | 10/2021 |
| EP | 3 164 168 | 12/2021 |
| EP | 3 344 129 | 12/2021 |
| EP | 3 624 867 | 3/2022 |
| EP | 3 651 822 | 3/2022 |
| EP | 3 689 389 | 3/2022 |
| EP | 3 737 436 | 3/2022 |
| EP | 3 972 661 | 3/2022 |
| EP | 3 984 589 | 4/2022 |
| EP | 3 654 006 | 5/2022 |
| EP | 3 737 310 | 7/2022 |
| EP | 2 999 400 | 8/2022 |
| EP | 3 711 788 | 8/2022 |
| EP | 3 694 573 | 9/2022 |
| EP | 3 600 477 | 10/2022 |
| EP | 3 897 768 | 10/2022 |
| EP | 2 892 583 | 1/2023 |
| EP | 3 370 797 | 1/2023 |
| EP | 3 597 231 | 1/2023 |
| EP | 3 668 562 | 1/2023 |
| EP | 3 856 275 | 1/2023 |
| EP | 3 003 420 | 2/2023 |
| EP | 3 397 299 | 2/2023 |
| EP | 3 046 594 | 3/2023 |
| EP | 3 938 005 | 4/2023 |
| EP | 3 685 562 | 5/2023 |
| EP | 3 397 298 | 7/2023 |
| EP | 3 809 959 | 7/2023 |
| EP | 2 072 150 | 9/2023 |
| EP | 2 961 984 | 9/2023 |
| EP | 3 352 808 | 9/2023 |
| EP | 3 768 156 | 9/2023 |
| EP | 4 052 754 | 10/2023 |
| EP | 3 157 596 | 11/2023 |
| EP | 3 766 428 | 11/2023 |
| EP | 3 781 027 | 11/2023 |
| EP | 4 061 470 | 11/2023 |
| EP | 4 070 720 | 11/2023 |
| EP | 3 449 958 | 12/2023 |
| EP | 3 687 596 | 12/2023 |
| EP | 3 768 340 | 12/2023 |
| EP | 3 801 675 | 1/2024 |
| EP | 3 566 636 | 2/2024 |
| EP | 3 634 526 | 2/2024 |
| EP | 3 768 347 | 2/2024 |
| EP | 3 790 606 | 2/2024 |
| EP | 3 930 780 | 2/2024 |
| EP | 3 397 147 | 3/2024 |
| EP | 3 782 695 | 3/2024 |
| EP | 3 854 448 | 3/2024 |
| EP | 4 140 532 | 5/2024 |
| EP | 3 693 038 | 6/2024 |
| EP | 3 970 765 | 7/2024 |
| EP | 3 854 444 | 9/2024 |
| EP | 3 793 674 | 10/2024 |
| EP | 3 618 885 | 11/2024 |
| EP | 4 034 221 | 11/2024 |
| EP | 3 809 960 | 12/2024 |
| EP | 3 854 446 | 2/2025 |
| EP | 4 429 754 | 2/2025 |
| EP | 3 970 785 | 3/2025 |
| EP | 4 429 753 | 3/2025 |
| EP | 3 950 043 | 5/2025 |
| EP | 3 899 964 | 6/2025 |

(56) References Cited

FOREIGN PATENT DOCUMENTS

| | | |
|---|---|---|
| EP | 4 039 319 | 6/2025 |
| EP | 4 297 672 | 7/2025 |
| ES | 2 913 485 | 6/2022 |
| JP | S59-080229 | 5/1984 |
| JP | S61-125329 | 6/1986 |
| JP | S62-113555 | 7/1987 |
| JP | S62-204733 | 9/1987 |
| JP | S62-282284 | 12/1987 |
| JP | S64-68236 | 3/1989 |
| JP | H02-055886 | 2/1990 |
| JP | H02-234750 | 9/1990 |
| JP | H05-079875 | 3/1993 |
| JP | H06-218044 | 8/1994 |
| JP | H07-047025 | 5/1995 |
| JP | H08-057042 | 3/1996 |
| JP | H08-066398 | 3/1996 |
| JP | H08-327527 | 12/1996 |
| JP | H10-052489 | 2/1998 |
| JP | H10-505766 | 6/1998 |
| JP | H11-239617 | 9/1999 |
| JP | 2000-512191 | 9/2000 |
| JP | 2001-037728 | 2/2001 |
| JP | 2001-506140 | 5/2001 |
| JP | 2001-276213 | 10/2001 |
| JP | 2002-525175 | 8/2002 |
| JP | 2003-019197 | 1/2003 |
| JP | 2003-047656 | 2/2003 |
| JP | 2003-062065 | 3/2003 |
| JP | 2004-515278 | 5/2004 |
| JP | 2005-028137 | 2/2005 |
| JP | 2005-192687 | 7/2005 |
| JP | 2006-528006 | 12/2006 |
| JP | 2007-222644 | 9/2007 |
| JP | 2008-511414 | 4/2008 |
| JP | 2006-518249 | 8/2008 |
| JP | 2008-178690 | 8/2008 |
| JP | 2009-504290 | 2/2009 |
| JP | 2009-240348 | 10/2009 |
| JP | 2010-518907 | 6/2010 |
| JP | 2012-520157 | 9/2012 |
| JP | 2013-128792 | 7/2013 |
| JP | 2014-524274 | 9/2014 |
| JP | 2015-514529 | 5/2015 |
| JP | 2015-514531 | 5/2015 |
| JP | 2015-515429 | 5/2015 |
| JP | 2015-122448 | 7/2015 |
| JP | 2015-527172 | 9/2015 |
| JP | 2015-181800 | 10/2015 |
| JP | 2016-002466 | 1/2016 |
| JP | 2016-509950 | 4/2016 |
| JP | 2017-500932 | 1/2017 |
| JP | 2017-176719 | 10/2017 |
| JP | 2017-532084 | 11/2017 |
| JP | 2019-523110 | 8/2019 |
| JP | 2020-072985 | 5/2020 |
| WO | WO 89/006513 | 1/1989 |
| WO | WO 92/015239 | 9/1992 |
| WO | WO 94/009835 | 5/1994 |
| WO | WO 98/043688 | 10/1998 |
| WO | WO 00/033047 | 6/2000 |
| WO | WO 2006/122001 | 11/2006 |
| WO | WO 2010/142286 | 12/2010 |
| WO | WO 2010/143272 | 12/2010 |
| WO | WO 2012/018917 | 2/2012 |
| WO | WO 2012/112378 | 8/2012 |
| WO | WO 2013/160443 | 10/2013 |
| WO | WO 2014/042925 | 3/2014 |
| WO | WO 2014/141284 | 9/2014 |
| WO | WO 2014/165635 | 10/2014 |
| WO | WO 2015/085220 | 6/2015 |
| WO | WO 2016/001284 | 1/2016 |
| WO | WO 2016/066180 | 5/2016 |
| WO | WO 2016/137743 | 9/2016 |
| WO | WO 2017/032751 | 3/2017 |
| WO | WO 2017/066257 | 4/2017 |
| WO | WO 2017/106190 | 6/2017 |
| WO | WO 2017/147291 | 8/2017 |
| WO | WO 2017/214118 | 12/2017 |
| WO | WO 2018/005228 | 1/2018 |
| WO | WO 2018/048800 | 3/2018 |
| WO | WO 2018/109038 | 6/2018 |
| WO | WO 2018/213089 | 11/2018 |
| WO | WO 2019/013794 | 1/2019 |
| WO | WO 2019/034670 | 2/2019 |
| WO | WO 2019/034775 | 2/2019 |
| WO | WO 2019/078723 | 4/2019 |
| WO | WO 2019/126721 | 6/2019 |
| WO | WO 2019/137911 | 7/2019 |
| WO | WO 2019/193604 | 10/2019 |
| WO | WO 2019/219883 | 11/2019 |
| WO | WO 2019/229210 | 12/2019 |
| WO | WO 2019/229220 | 12/2019 |
| WO | WO 2019/234145 | 12/2019 |
| WO | WO 2019/234146 | 12/2019 |
| WO | WO 2019/234148 | 12/2019 |
| WO | WO 2019/234149 | 12/2019 |
| WO | WO 2019/234151 | 12/2019 |
| WO | WO 2019/234152 | 12/2019 |
| WO | WO 2019/234153 | 12/2019 |
| WO | WO 2019/234161 | 12/2019 |
| WO | WO 2019/234162 | 12/2019 |
| WO | WO 2019/234163 | 12/2019 |
| WO | WO 2019/234164 | 12/2019 |
| WO | WO 2019/234166 | 12/2019 |
| WO | WO 2019/234167 | 12/2019 |
| WO | WO 2019/234169 | 12/2019 |
| WO | WO 2019/243582 | 12/2019 |
| WO | WO 2020/030686 | 2/2020 |
| WO | WO 2020/030706 | 2/2020 |
| WO | WO 2020/064707 | 4/2020 |
| WO | WO 2020/089429 | 5/2020 |
| WO | WO 2020/198280 | 10/2020 |
| WO | WO 2020/243756 | 12/2020 |
| WO | WO 2023/040546 | 12/2021 |
| WO | WO 2022/074136 | 4/2022 |
| WO | WO 2022/109590 | 5/2022 |
| WO | WO 2022/173970 | 8/2022 |
| WO | WO 2023/226779 | 9/2022 |
| WO | WO 2023/049813 | 3/2023 |
| WO | WO 2024/104184 | 5/2024 |

OTHER PUBLICATIONS

Mushi et al., "Identification of Fluidic Element Models to Simulate the Short-Term Baroreflex", Proceedings of the 45th IEEE Conference on Decision & Control, San Diego, CA, Dec. 13-15, 2006, pp. 6.
Vollkron et al., "Advanced Suction Detection for an Axial Flow Pump", Artificial Organs, 2006, vol. 30, No. 9, pp. 665-670.
Vollkron et al., "Development of a Suction Detection System for Axial Blood Pumps", Artificial Organs, 2004, vol. 28, No. 8, pp. 709-716.
Hertz PH.D et al., "Ultrasonic Engineering in Heart Diagnosis", The American Journal of Cardiology, Jan. 1967, vol. 19, No. 1, pp. 6-17.
International Preliminary Report on Patentability and Written Opinion received in PCT Application No. PCT/EP2019/064780, dated Sep. 21, 2020 in 17 pages.
International Search Report and Written Opinion received in PCT Application No. PCT/EP2019/064780, dated Aug. 14, 2019 in 11 pages.
Kong et al., "A Stein Equation Approach for Solutions to the Diophantine Equations," 2010 Chinese Control and Decision Conference, Xuzhou, May 26, 2010, pp. 3024-3028.
McCormick et al., "Resolution of a 2/spl pi/ Ambiguity Problem in Multiple Frequency Spectral Estimation," in IEEE Transactions on Aerospace and Electronic Systems, Jan. 1995, vol. 31, No. 1, pp. 2-8.
Syrmos et al., "A Generalized Bezout Equation in Output Feedback Design," Proceedings of the 31st IEEE Conference on Decision and Control, Tucson, AZ, USA, Dec. 1992, vol. 4, pp. 3590-3594.

(56) References Cited

OTHER PUBLICATIONS

Udesen et al., "A Simple Method to Reduce Aliasing Artifacts in Color Flow Mode Imaging", IEEE Ultrasonics Symposium, 2005, Rotterdam, The Netherlands, Sep. 18-21, 2005, pp. 1352-1355.

Koseli et al., "Online Viscosity Measurement of Complex Solutions Using Ultrasound Doppler Velocimetry", Turk J Chem, Jan. 2006, vol. 30, pp. 297-305.

Atkinson et al., "Pulse-Doppler Ultrasound and Its Clinical Application", The Yale Journal of Biology and Medicine, 1977, vol. 50, pp. 367-373.

Leguy et al., "Assessment of Blood vol. Flow in Slightly Curved Arteries from a Single Velocity Profile", Journal of Biomechanics, 2009, pp. 1664-1672.

Murali, Akila, "Design of Inductive Coils for Wireless Power Transfer to Pediatric Implants", A graduate project submitted in partial fulfillment of the requirements for the degree of Master of Science in Electrical Engineering, California State University, Northridge, May 2018, p. 37.

Sinha et al., "Effect of Mechanical Assistance of the Systemic Ventricle in Single Ventricle Circulation with Cavopulmonary Connection", The Journal of Thoracic and Cardiovascular Surgery, Apr. 2014, vol. 147, No. 4, pp. 1271-1275.

"Understanding Hot-Wire Anemometry", Advanced Thermal Solutions, Inc., 2007, pp. 13-17.

Vieli, A., "Doppler Flow Determination", BJA: British Journal of Anaesthesia, 1988, vol. 60, pp. 107S-112S.

Yuanyuan et al., "Characteristics Analysis for Doppler Ultrasound Blood Flow Signals", China Medical Device Information, 5(1), Feb. 28, 1999, pp. 36-42.

Zhang, Dabiao et al., "Design of Microwave Velocity and Distance Monitor System", Instrument Technique and Sensor, Hebei Normal University, Apr. 25, 2004, pp. 3.

HeartMate 3™ Left Ventricular Assist System, Instructions for Use, Thoratec Corporation, Aug. 2017, pp. 536. [Uploaded in 3 parts].

Tan et al., "Surface Engineering and Patterning Using Parylene for Biological Applications." Materials, Mar. 15, 2010, vol. 3, No. 3, pp. 1803-1832.

Chung et al., "Improved Efficiency Characteristics of Wireless Power Charging System for Superconducting MAGLEV Train Using Inserted Permanent Magnets," 2018 IEEE International Symposium on Electromagnetic Compatibility, 2018, pp. 564-567.

"ECG Electrodes product comparison chart," 3M.com, 2018, https://multimedia.3m.com/mws/media/1490883O/red-dot-ecg-electrodes-comparison-chart.pdf, accessed May 18, 2025, 1 page.

Eeckhout, MD, PhD, et al., "Handbook of Complications During Percutaneous Cardiovascular Interventions", 2007 Informa UK Ltd., Ch. 12, pp. 167-177.

Mack-Haynes, Robin, "Fasteners Made Easy," New Mexico State University, https://pubs.nmsu.edu/_c/C232.pdf, accessed May 18, 2025, p. 8.

Mullins, Charles E., MD, "Cardiac Catheterization in Congenital Heart Disease: Pediatric and Adult", Blackwell Futura, 2006, Chapters 3, 4 and 32, p. 101.

Sigg et al., "Cardiac Electophysiology Methods and Models", Springer, Clinical Perspective: Electrophysiology in the Young and Patients with Congenital Heart Disease, Ch. 23, 2010, pp. 457-477.

\* cited by examiner

SENSOR HEAD DEVICE FOR A MINIMAL INVASIVE VENTRICULAR ASSIST DEVICE AND METHOD FOR PRODUCING SUCH A SENSOR HEAD DEVICE

BACKGROUND

Field

The invention proceeds from a device or a method according to the class of the independent claims. The subject matter of the present invention is also a computer program.

Description of the Related Art

Heart support systems, such as implanted left ventricular support systems, can have a plurality of sensors for detecting body parameters.

SUMMARY

The invention is based on the object of improving a sensor head device in the sense of an optimization of the sensor or signal transmitter integration and encapsulation and to specify a corresponding advantageous production method.

Against this background, a sensor head device for a minimally invasive heart support system, a method for producing a sensor head device for a heart support system, and a device that uses this method as well as, lastly, a corresponding computer program according to the main claims are presented with the approach presented here. Advantageous developments and improvements of the device specified in the independent claim are possible by means of the measures listed in the dependent claims.

The approach presented here of a sensor head device for a heart support system relates to improved integration and encapsulation of sensor technology in a, for example, minimally invasive left ventricular heart support system in aortic valve position. In this case, the sensor head device is designed as a plug-shaped sensor package, for example, which can, for example, be arranged at a distal end of a supply cannula of a heart support system, and has at least one cavity for at least one electronic sensor and/or for at least one signal transmitter, e.g., an ultrasound element.

A sensor head device for a minimally invasive heart support system insertable into a patient is presented, wherein the sensor head device has at least the following feature:

a sensor carrying element having at least one sensor cavity for accommodating at least one sensor and/or at least one signal transmitter cavity for accommodating at least one signal transmitter.

A sensor head device can be a structural element of a heart support system, which serves to integrate or accommodate a sensor assembly, e.g., a temperature sensor and/or pressure sensor and/or an ultrasound element. A heart support system, also called artificial heart or VAD (ventricular assist device), can be understood to mean a pumping device for increasing the pump performance of a heart. The heart support system can be insertable into a heart chamber or into the aorta by means of a catheter, for example. The heart support system may in particular be a (percutaneous) left ventricular support system. A sensor carrying element can be a carrying component, e.g., a housing, a rack, and/or a frame, on which at least one sensor and/or at least one signal transmitter can be or is arranged, wherein the sensor and/or the signal transmitter is mechanically protected and securely supported by the sensor carrying element. A sensor cavity can be understood to mean a cavity (e.g., formed squarely or cubically or in the form of an at least partially circumferential groove), which is formed, for example, in a sensor carrying element of a sensor head device and serves to accommodate and encapsulate a sensor. A sensor can, for example, be a technical component which can detect specific physical variables, such as temperature and pressure, either qualitatively or quantitatively as a measured variable. These variables can in this case be detected by means of physical effects and, for example, converted into a further processable electrical signal. A signal transmitter cavity can be understood to mean a cavity (e.g., formed squarely or cylindrically) that is formed, for example, in a sensor carrying element of a sensor head device and serves to accommodate and encapsulate a signal transmitter. A signal transmitter can, for example, be an ultrasound element as a transmitter and/or receiver for ultrasound.

The advantages of the approach presented here of a sensor head device for a heart support system (e.g., a heart support system that is minimally invasively insertable into a patient) in particular consist in creating a possibility for optimized integration and encapsulation of at least one pressure sensor and/or temperature sensor in a tip of a heart support system. There are currently no systems available on the market that insert active electronic components and sensor technologies in the head region of a heart support system. In this case, a blood temperature of a person with heart disease can advantageously be measured by an integrated temperature sensor, for example. Since sepsis is a common complication in patients with an implanted heart support system, a febrile infection can be detected in good time and treated or prevented early on by means of a trend analysis of the blood temperature, for example. By means of improved integration and encapsulation of a (preferably barometric) pressure sensor, a ventricular pressure of a heart disease patient can be detected, for example. The integration in this case is designed, for example, in such a way that the pressure measurement is not falsified by the slight negative pressure in a guide cannula of the heart support system. The determined pressure data can be used, for example, to measure the ventricular pressure of a patient and to regulate the pump on the basis of the ventricular pressure in order to protect the ventricle from collapse, for example. The pressure data determined in this way can also be used, for example, to determine a differential pressure, i.e., aortic pressure minus ventricular pressure, across the pump and thus to monitor the pump, the pump performance, or the function of the pump.

According to one embodiment, the sensor carrying element can have a channel extending in the longitudinal direction of extension of the sensor head device and/or the at least one sensor cavity can be open in a different direction than the at least one signal transmitter cavity. Such an embodiment of the approach presented here offers the advantage that such a channel allows a guide wire to be guided centrally through the sensor carrier provided with sensor cavities. This ensures optimum mechanical protection and secure mounting. A very precise measurement of body parameters can also be achieved as a result of the different opening directions of the cavities.

According to one embodiment, the sensor carrying element can have a rounded cap at one outer end. In cross section, the rotationally symmetric sensor carrying element can alternatively or additionally have outer walls (e.g., cylindrical outer walls) arranged in the shape of a U and/or E and/or have inner walls (e.g., cylindrical inner walls) arranged in the shape of a U and/or E at at least one inner end, wherein the at least one signal transmitter cavity or sensor cavity is in particular formed between the outer walls and/or between the outer and inner walls. Such an embodiment of the approach presented here offers the advantage that an outer end with a rounded cap or an outer end of the sensor head device designed in the shape of a mushroom head is advantageously formed to introduce the heart support system into the patient in order to not induce any injuries in a heart disease patient or to ensure good sliding properties, for example, when the heart support system is advanced during implantation of the system. In this case, the outer end designed in the shape of a mushroom head, but also, for example, an outer end designed in the shape of a pot, continues to provide mechanical protection and secure encapsulation for the integrated sensors.

Such an embodiment of the approach presented here furthermore offers the advantage that an embodiment of the sensor head device as a type of stopper at the end of a guide cannula of a heart support system allows simple production of the sensor head device, wherein the manufacturing process saves time and money.

According to one embodiment, the sensor carrying element can have an opening in its center, wherein the opening has in particular a cylindrical tube. The tube can be inserted into the opening and/or formed therein over the entire length of the sensor carrying part, for example. Such an embodiment of the approach presented here offers the advantage that a guide wire can, for example, be inserted into the opening and/or into the cylindrical tube. When implanting a heart support system into the left heart chamber or the aorta of a heart disease patient, the guide wire can first be laid to the ventricle of the patient. The heart support system can then be pushed onto the guide wire and advanced along the guide wire to the end position. In this way, very precise positioning of the heart support system can be achieved.

According to one embodiment, the sensor head device can have at least one sensor, in particular a sensor designed as a temperature sensor and/or pressure sensor, and/or at least one signal transmitter, in particular a signal transmitter designed as an ultrasound element or ultrasound transducer for emitting and/or receiving ultrasound. Alternatively or additionally, the at least one sensor and/or the at least one signal transmitter can be arranged on an electrical conductive element. The ultrasound element can, for example, also have its own housing, wherein an outer wall around the ultrasound element can be omitted. In this case, the wall can be used for both mechanical stabilization and encapsulation of the ultrasound element for the purpose of biocompatibility. Such an embodiment of the approach presented here offers the advantage that integration of at least one ultrasound element into a sensor head device of a heart support system allows a volume flow measurement of the blood of the heart disease patient.

According to one embodiment, the signal transmitter cavity can be covered at least partially by a lens element, wherein the lens element is in particular designed as an ultrasonic lens and/or made of a silicone material. Such an embodiment of the approach presented here offers the advantage that an ultrasonic lens is used for sound formation of the ultrasonic energy, the ultrasonic lens furthermore securely encapsulates the ultrasound element, and the ultrasonic lens can conduct the blood flow of the heart disease patient entering through a plurality of inlet ports.

According to one embodiment, the sensor carrying element can be formed from a thermoplastic and/or made in a machining manufacturing process and/or as an injection molded part. Such an embodiment of the approach presented here offers the advantage that high-quality and resilient medical products can be manufactured by means of injection molding processes, for example. The flush production from the original raw material to the finished injection molded part makes the injection molding process a fast and cost-effective process, which can be used, for example, for the manufacturing of precision parts. Particularly extremely small individual parts, such as those for the manufacture of a minimally invasive heart support system, benefit from the exact production. As a rule, further post-processing of the finished part is not necessary so that production can be completed quickly.

According to one embodiment, the sensor cavity can be filled with a casting compound, wherein the casting compound in particular comprises a solid or gel-like silicone or a silicone oil. Such an embodiment of the approach presented here offers the advantage that filling the sensor cavity with a casting compound can protect the sensors from blood and mechanical damage, for example. In this case, the casting compound should be able to transfer the cardiac pressure of the patient determined by a pressure sensor in order to continue to enable precise pressure measurements. The casting compound can be, for example, a solid and/or gel-like silicone or even a silicone oil, wherein this casting compound necessitates an additional encapsulation of the sensors.

According to one embodiment, the sensor cavity can be coated and/or covered by means of a membrane and/or a diffusion barrier, wherein the membrane is in particular designed as a film and/or a layer separated from a gas or vapor phase and/or the diffusion barrier comprises a parylene material. When using a silicone oil for filling the sensor cavity, the surface of the sensor cavity is closed by means of a membrane, e.g., made of a polymer or a metal such as titanium. No surface treatment of the sensor cavity is necessary when using a solid and/or gel-like silicone. However, due to a possibly occurring diffusion of water into the silicone, the silicone can swell and thereby, for example, cause a tension on the pressure sensor membrane of the pressure sensor, which in turn can lead to an error of the pressure sensor. The solid and/or gel-like silicone can therefore be coated with a water barrier and/or diffusion barrier on a parylene basis, for example.

The approach presented here furthermore creates a heart support system with a sensor head device, wherein the sensor head device is arranged at one end of a guide cannula, wherein the sensor head device is in particular electrically connectable or electrically connected by means of a connecting element to an electrical conductive element of the guide cannula. The special advantages of the approach presented here can also be realized easily and cost-effectively by such an embodiment.

A method for producing a sensor head device for a heart support system is presented, wherein the method comprises at least the following step:

forming a sensor carrying element having at least one sensor cavity for accommodating at least one sensor and/or at least one signal transmitter cavity for accommodating at least one signal transmitter in order to produce a sensor head device for a heart support system.

According to one embodiment, the method can comprise a step of inserting at least one sensor into the sensor cavity and/or at least one signal transmitter into the at least one signal transmitter cavity of the shaped sensor carrying element.

The method presented here for producing a sensor head device for a heart support system can be implemented, for example, in software or hardware or in a mixed form of software and hardware in a control device, for example.

The approach presented here furthermore creates a device that is designed to carry out, control, or implement in corresponding devices the steps of a variant of a method presented here for producing a sensor head device for a heart support system. The object underlying the invention can also be achieved quickly and efficiently with this design variant of the invention in the form of a device.

For this purpose, the device can have at least one computing unit for processing signals or data, at least one memory unit for storing signals or data, at least one interface to a sensor or an actuator for reading sensor signals from the sensor or for outputting data or control signals to the actuator and/or at least one communication interface for reading or outputting data that are embedded in a communication protocol. The computing unit can, for example, be a signal processor, a microcontroller, or the like, whereby the memory unit can be a flash memory, an EEPROM, or a magnetic memory unit. The communication interface can be designed to read or output data in a wireless and/or wire-bound manner, wherein a communication interface that can read or output wire-bound data can, for example, read said data electrically or optically from a corresponding data transmission line or output them into a corresponding data transmission line.

In the present case, a device can be understood to mean an electrical device that processes sensor signals and, as a function thereof, outputs control signals and/or data signals. The device can have an interface, which can be designed by means of hardware and/or software. In a design by means of hardware, the interfaces can, for example, be part of a so-called system ASIC that includes various functions of the device. However, it is also possible that the interfaces are separate, integrated circuits or at least partially consist of discrete structural elements. In a design by means of software, the interfaces can be software modules, which are present on a microcontroller in addition to other software modules, for example.

A computer program product or computer program having program code which can be stored on a machine-readable carrier or storage medium such as a semiconductor memory, a hard drive memory, or optical memory and is used to carry out, implement, and/or control the steps of the method according to one of the embodiments described above is also advantageous, in particular if the program product or program is executed on a computer or a device.

BRIEF DESCRIPTION OF THE DRAWINGS

Exemplary embodiments of the approach presented here are shown schematically in the drawings and explained in more detail in the following description. The drawings show.

DETAILED DESCRIPTION

In the following description of favorable exemplary embodiments of the present invention, the same or similar reference signs are used for the elements which are shown in the various figures and have a similar effect, wherein a repeated description of these elements is omitted.

Figure 1:
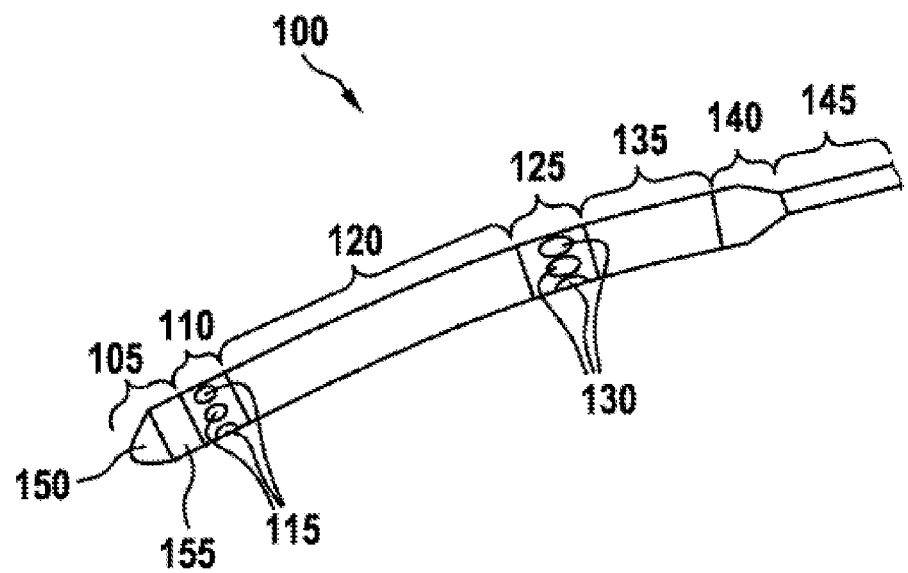
FIG. 1 a schematic view of a heart support system according to an exemplary embodiment.

FIG. 1 shows a schematic view of a heart support system 100 according to an exemplary embodiment. By way of example, FIG. 1 shows a left ventricular heart support system 100 with an integrated sensor head device 105. The heart support system 100 has, by way of example, a cylindrical, elongated structure with a substantially constant outer diameter and rounded, tapered ends for easy positioning by means of a catheter in a blood vessel, e.g., the left heart chamber or the aorta.

The heart support system 100, here by way of example a left ventricular heart support system 100 for percutaneous implantation into a left heart chamber, first has the sensor head device 105. The heart support system 100 furthermore has an inlet cage 110 with a plurality of inlet openings 115 via which the blood of the heart disease patient enters the heart support system 100, a guide cannula 120, an impeller cage 125 with impeller and a plurality of outlet openings 130, a coupling and motor housing 135, a back end 140 with sensor technology, optional sensor hub, and an electrical connection field, as well as lastly a connection cable 145 for connecting the heart support system 100 to an external energy source or an external evaluation or control device.

The sensor head device 105 of the heart support system 100 has, by way of example, a rounded outer end 150 facing away from the heart support system 100 as well as a sensor assembly which is arranged in at least one sensor cavity 155, which may also be designed as a circumferential groove, of the sensor head device 105 and which is used, for example, to measure the pressure and/or temperature of a heart disease patient. In this case, the sensor head device 105 is arranged at an inner end (not shown) on the inlet cage 110, wherein the inlet cage 110 can also be designed as an integral component of the guide cannula 120. In addition, the sensor head device 105 can, for example, be electrically connected by means of a connecting element (not shown) of the inlet cage 110 to an electrical conductive element (not shown) of the guide cannula 120.

Figure 2:
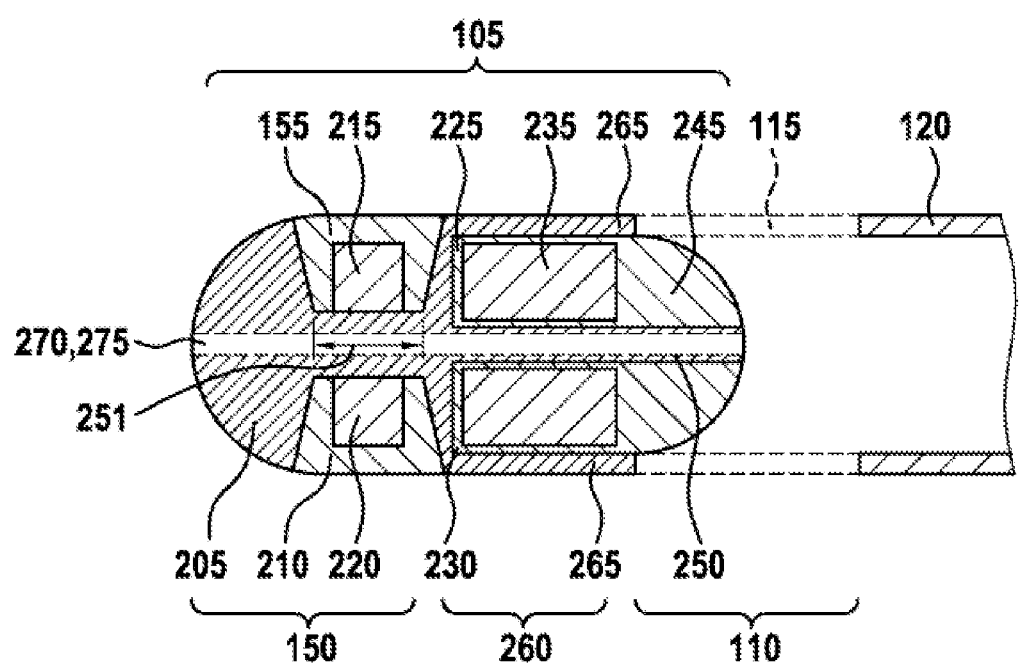
FIG. 2 a schematic view of a first design variant of a sensor head device for a heart support system according to an exemplary embodiment.

FIG. 2 shows a schematic view of a first design variant of a sensor head device 105 for a heart support system according to an exemplary embodiment. The sensor head device 105 is arranged by way of example at an inner end on the inlet cage 110 or the guide cannula 120, wherein the sensor head device 105 is electrically connected by means of a connecting element (not shown) of the inlet cage 110 to an electrical conductive element (not shown) of the guide cannula 120.

The sensor head device 105 has a sensor carrying element 205, which by way of example forms the base body of the sensor head device 105. The sensor carrying element 205 is, for example, made of a thermoplastic in an injection molding process but may alternatively also be manufactured in a machining manufacturing process.

The sensor carrying element 205 shown here has, by way of example, a circumferential or at least partially circumferential sensor cavity (155 and 210) (which, however, may also be designed as two separate sensor cavities 155 and 210) for accommodating by way of example two sensors 215 and 220. The sensor carrying element 205 furthermore has, by way of example, a cylindrical signal transmitter cavity (225 and 230) for accommodating a cylindrical signal transmitter 235. The sensor 215 and/or 220 is, by way of example, a temperature sensor and/or pressure sensor but in particular a barometric absolute pressure sensor. The signal transmitter 235 is, by way of example, an ultrasound element, onto which, according to one exemplary embodiment, a lens element 245, e.g., an ultrasonic lens, made of silicone is positioned, wherein the lens element 245 at least partially covers the signal transmitter cavity 225.

According to one exemplary embodiment, the signal transmitter cavity 225 is open in a different direction than the sensor cavity 155, wherein the signal transmitter cavity 225 is open in a direction facing the heart support system so that the main beam direction of the signal transmitter points into the axis of the guide cannula 120. The at least one sensor cavity 155 is manufactured by way of example as an at least partially circumferential groove (e.g., at an angle of 330° in the circumferential direction around an outer surface of the sensor head device 105) and is radially open. In a particularly advantageous manner, the walls of the groove as a sensor cavity 155 are designed in such a way that the groove is wider toward the outside than at the base. As a result, swelling of silicone, which is introduced in a production step of the sensor carrying element 205 as a seal into the groove as well as into a sensor 215 arranged therein, then leads less to a tension of the MEMS element as sensor 215.

The sensor carrying element 205 has a channel 270 extending along a longitudinal direction of extension of the sensor head device 105, wherein in the first design variant of a sensor carrying element 205 shown here, the channel 270 ends centrally, by way of example, in an outer end 150 of a rounded cap or a mushroom head form facing away from the heart support system. The mushroom head-shaped outer end 150 of the sensor head device 105 is rounded in order to not induce any injuries in the heart disease patient and to ensure good sliding properties when advancing the heart support system during the implantation of the system.

In its center, by way of example, the sensor carrying part 205 has an opening 271. In this case, the opening 271 serves to accommodate a guide wire (not shown). When implanting a heart support system into the left heart chamber or into the aorta of a heart disease patient, the guide wire is first laid to the ventricle of the patient. The heart support system is then pushed onto the guide wire and advanced along the guide wire to the end position.

In a first embodiment for guiding the guide wire in the region of the signal transmitter cavity, the sensor carrier 205 can include a tubular continuation 250, which extends so far into the signal transmitter cavity that the guide wire is guided to the contact surface between ultrasonic lens 245 and blood in the region 110. In a second embodiment, a small tube 275 (e.g., a metallic tube made of stainless steel, titanium, or NiTiNoI, for example) is inserted into the channel 270 and extends through the sensor carrying part 205 and beyond it into the signal transmitter cavity 225 to the contact surface between ultrasonic lens 245 and blood in the region 110. The second embodiment has the advantage of a wall thickness that can be significantly less, which results in a reduced central opening width in the signal transmitter, which is advantageous above all when the signal transmitter is designed as an ultrasound transducer.

Toward the outside, the signal transmitter cavity is limited by a cylinder jacket 265, which is, by way of example, part of the design of the sensor carrying part 205. The cylindrical signal transmitter 235 can consequently be designed to have its central opening on the continuation 250 or the small tube 275 (depending on the design variant) and be inserted into the signal transmitter cavity 225. The gap between 250 and 235 or 275 and 235 as well as between 235 and 265 can be filled, for example, by epoxy or silicone, which also serves as adhesive fixation at the same time.

The mushroom head-shaped outer end 150 represents an additional mechanical protection for the sensors 215, 220 arranged in the at least one sensor cavity 155. In order to lay the sensors 215 and 220 around the web 251 (which is, for example, cuboidal here), it is necessary in the first design variant of a sensor head device 105 shown here to arrange the sensors 215 and 220 on a flexible circuit board or a thin-film substrate. The sensors 215, 220 are bonded to a thin-film substrate, for example. In the region of the sensors 215, 220, the thin-film substrate should not be bent, which is why it may be supported here with stiffening elements, but above all, the substrate is not cylindrically round but is designed as a cuboid with rounded corners. The rounded corners of the web 251 serve, for example, to maintain the bending radii of the thin-film substrate (polyimide gold layer structure).

According to one exemplary embodiment, the at least one sensor cavity 155 is filled with a casting compound to protect the sensors 215, 220 from blood and mechanical damage. In this case, the casting compound can be a solid and/or gel-like silicone or even a silicone oil. In this case, the casting compound should be able to transfer a cardiac pressure of a patient in order to continue to enable precise pressure measurement by the sensors 215 or 220.

Figure 3A:
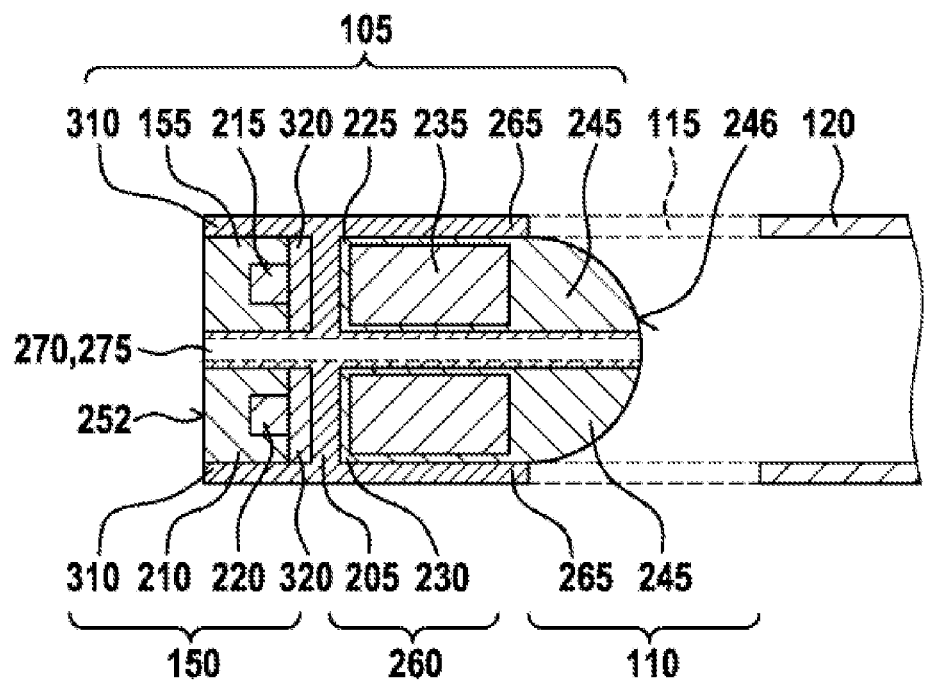
FIG. 3A a schematic view of a second design variant of a sensor head device for a heart support system according to an exemplary embodiment.

FIG. 3A shows a schematic view of a second design variant of a sensor head device 105 for a heart support system 100 according to an exemplary embodiment. The sensor head device 105 is arranged by way of example at an inner end on the guide cannula 120 or on the inlet cage 110, wherein the sensor head device 105 is electrically connected by means of a connecting element (which is not shown here) of the inlet cage 110 to an electrical conductive element (not shown) of the guide cannula 120. In the narrower sense, the electrical conductive element is, for example, laid completely in one piece from the back end 140 to the sensor head device 105 by affixing across all components of the sensor head device 205.

The sensor head device 105 has a sensor carrying element 205, which by way of example forms the base body of the sensor head device 105. The sensor carrying element 205 is, for example, made of a thermoplastic in an injection molding process but may alternatively also be manufactured in a machining manufacturing process.

The sensor carrying element 205 shown here has, by way of example, two sensor cavities 155 and 210 or, as already described in detail above, an at least partially circumferential groove as sensor cavity 155 for accommodating one sensor 215 or 220 each. The sensor carrying element 205 furthermore has, by way of example, a signal transmitter cavity 225 for accommodating a signal transmitter 235. The sensor 215 and/or 220 is, by way of example, a temperature sensor and/or pressure sensor but in particular a barometric absolute pressure sensor. The signal transmitter 235 is, by way of example, an ultrasound element, onto which, according to one exemplary embodiment, a lens element 245, e.g., an ultrasonic lens, made of silicone is positioned, wherein the lens element 245 at least partially covers the signal transmitter cavity 225 and 230.

According to one exemplary embodiment, the signal transmitter cavity 225 is open in a different direction than the sensor cavity 155 or the two sensor cavities 155 and 210 if the sensor cavity 155 is not formed by an at least partially circumferential groove, wherein the signal transmitter cavity 225 or the two signal transmitter cavities 225 or 230 are open in a direction facing the heart support system. The first sensor cavity 155 is open, by way of example, in a direction facing away from the heart support system, wherein the sensor cavity 155 is therefore open in a direction offset by 90° with respect to the signal transmitter cavity 225.

The sensor carrying element 205 has a channel 270 extending along a longitudinal direction of extension of the sensor head device 105, wherein the channel in the first design variant of a sensor head device 105 shown here extends through a web-like continuation 250 to the surface 252 of the sensor cavity or the surface of the signal transmitter 235 or the surface 246 of the optional ultrasonic lens. In an embodiment not shown, the web-like continuation 250 can be formed by a small tube 275 (e.g., a small metallic tube) so that the channel 270 can be designed with thin walls. The sensor cavity 155 located by way of example at an outer end 150 facing away from the heart support system can have an outer wall with a U-shaped cross section or, when using a web-shaped continuation 250, an E-shaped outer wall 310. According to one exemplary embodiment, the sensor cavity 155 or one sensor cavity 155, 210 each for accommodating a sensor 215, 220 is formed between an outer wall 310 each and the web-like continuation 250 or the small tube 275. This design variant of an outer end 150 thus has a pot shape by way of example. The continuation of the channel 270 to an inner end 260 can also be carried out by a web 250 or as a small tube 275. The signal transmitter cavity located there has walls with a U-shaped cross section or, when using the web 250, E-shaped walls, wherein the signal transmitter cavity 225 for accommodating a signal transmitter 235 is formed between a pair each of inner walls 265 according to one exemplary embodiment.

An advantage of the design variant of the sensor head device 105 shown here is that the sensors 215 and 220 can be pre-mounted, for example, on a circular circuit board 320, wherein in an alternative exemplary embodiment, the signal transmitter 235 can also be pre-mounted on a circular circuit board.

According to one exemplary embodiment, the sensor cavities 155 or the two sensor cavities 155, 210 are filled with a casting compound to protect the sensors 215, 220 from blood and mechanical damage. In this case, the casting compound can be a solid and/or gel-like silicone or even a silicone oil. In this case, the casting compound should be able to transfer the cardiac pressure of a patient in order to continue to enable precise pressure measurement by the sensors 155 and 210.

In its center, by way of example, the sensor carrying element 205 has a channel 270, wherein a cylindrical tube 275 is positioned in the channel 270 by way of example. The tube 275 (which can also be referred to as a small tube) can be inserted into and/or formed in the opening 271 over the entire length of the sensor head device 105. In this case, the opening 271 or the cylindrical tube 275 serves to accommodate a guide wire (not shown). When implanting a heart support system into the left heart chamber or into the aorta of a heart disease patient, the guide wire is first laid to the ventricle of the patient. The heart support system is then pushed onto the guide wire and advanced along the guide wire to the end position.

Figure 3B:
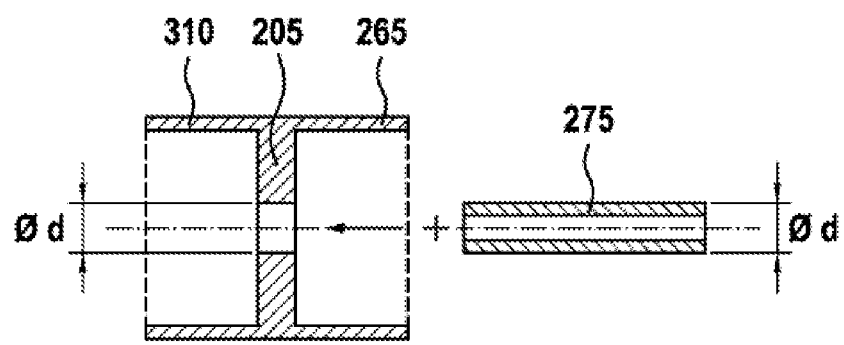
FIG. 3B a schematic view of a further design variant of a sensor head device for a heart support system according to an exemplary embodiment.

FIG. 3B shows a schematic view of a further design variant of a sensor head device 105 for a heart support system 100 according to an exemplary embodiment. In contrast to the design variant of the sensor head device 105 shown in FIG. 3A, the small cylindrical tube 275, which is inserted into the central part of the sensor carrying element 205, is now provided in the design variant shown in FIG. 3B in order to form the channel 270 or the opening 271. In this case, the small tube 275 has a diameter that is larger than the diameter of an opening of the sensor carrying element 205 so that after insertion into the sensor carrying element 205, the small tube 275 can be held in the sensor carrying element 205 by means of a press fit.

Figure 3C:
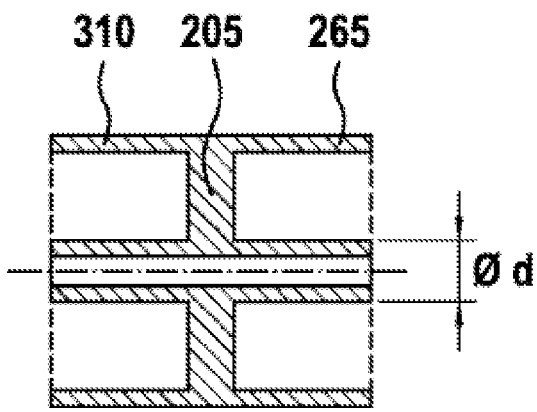
FIG. 3C a schematic view of a further design variant of a sensor head device for a heart support system according to an exemplary embodiment.

FIG. 3C shows a schematic view of a further design variant of a sensor head device for a heart support system according to an exemplary embodiment. The sensor carrying element 205 shown in FIG. 3C is shown here as a one-part or one-piece component, as used in the illustration of FIG. 3A, for example.

Figure 4:
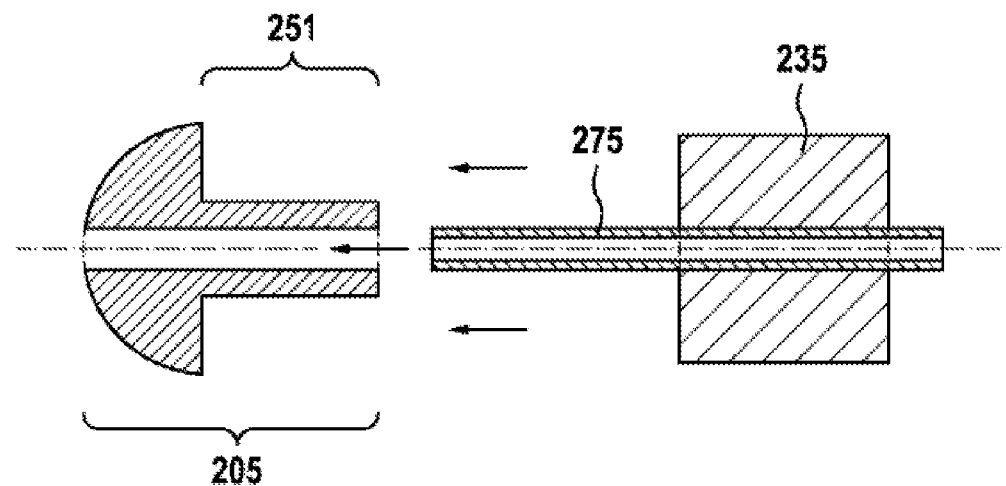
FIG. 4 a schematic view of a sensor carrying part of a sensor head device according to an exemplary embodiment.

FIG. 4 shows a schematic view of a sensor carrying part 205 of a sensor head device 105 according to an exemplary embodiment. By way of example, the sensor carrying part 205 is realized in several parts in the illustration shown here. A simple demolding of the sensor carrying part 205 as an injection molded part made of a thermoplastic, e.g., of polyether ether ketone, is thus possible. In this case, the injection molded part or the sensor carrying element 205 comprises only the mushroom cap-shaped outer end 150 with the web 251, wherein a cylindrical tube 275, which is, for example, made of a metal material, is inserted into a centrally formed channel 270 of the sensor carrying part 205. The tube 275 can be inserted, by way of example, into the channel 270 over the entire length of the sensor carrying part 205 and serves, by way of example, to accommodate a guide wire (not shown). According to one exemplary embodiment, a sensor cavity 155 or one sensor cavity 155 and 210 each is formed on the side facing away from the mushroom cap above and below the web 251, wherein said sensor cavity 155 (or the sensor cavities 155 and 210 each) serve to accommodate at least one sensor. The individual parts of the sensor carrying part 205 can, by way of example, be joined together by means of a biocompatible adhesive.

Figure 5:
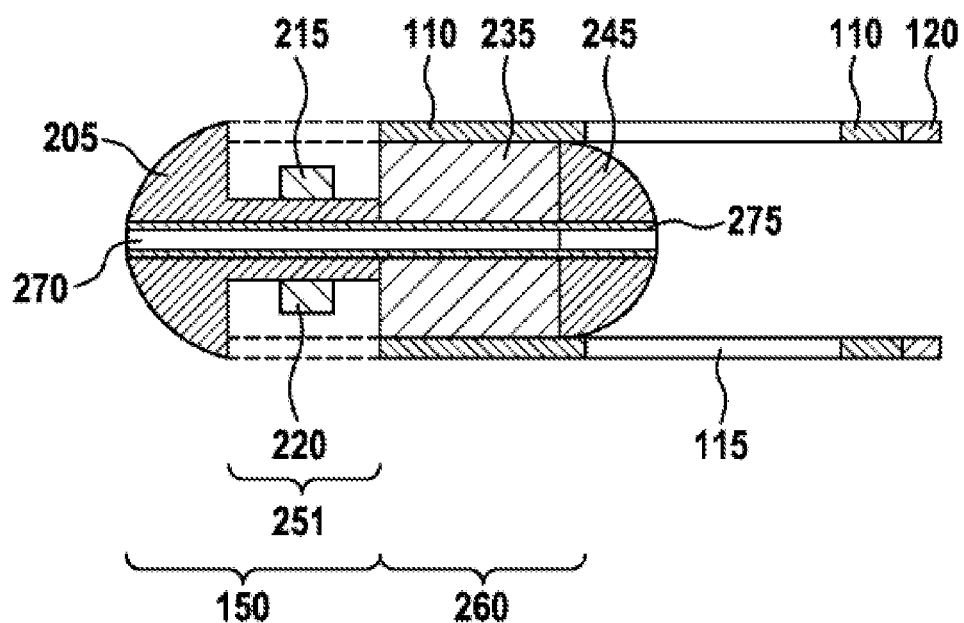
FIG. 5 a schematic view of a cylindrical ultrasound element of a sensor head device according to an exemplary embodiment.

FIG. 5 shows a schematic view of a cylindrical ultrasound element 235, which is pushed onto a sensor carrying element 205 of a sensor head device 105 according to an exemplary embodiment. By way of example, the ultrasound element 235 shown here has an opening provided for pushing onto the tube 275. In this case, the tube 275 is inserted into the opening of the sensor carrying element in the region of the ultrasound element 235 in order to ensure encapsulation of the ultrasound element 235 from the inside as well. The ultrasound element 235 may, by way of example, be piezoelectric elements with necessary backing and impedance adaptation layers and/or may be hermetically sealed elements. The ultrasound element 235 is arranged, by way of example, on a circular circuit board and in this case integrated into the sensor head device and encapsulated therein such that the ultrasound element 235 points in the direction of the guide cannula. The ultrasound element 235 is thus optimally integrated into and securely encapsulated in the cylindrical shape of the guide cannula or of the entire heart support system.

Figure 6:
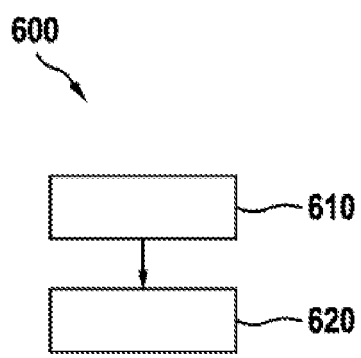
FIG. 6 a flow diagram of an exemplary embodiment of a method for producing a sensor head device for a heart support system according to an exemplary embodiment.

FIG. 6 shows a flow chart of an exemplary embodiment of a method 600 for producing a sensor head device for a heart support system according to an exemplary embodiment.

In a step 610 of the method 600, a sensor carrying element with at least one sensor cavity for accommodating at least one sensor and/or at least one signal transmitter cavity for accommodating at least one signal transmitter is formed in order to produce a sensor head device for a heart support system. In a step 620 of the method 600, lastly, at least one sensor is inserted into the sensor cavity and/or at least one signal transmitter is inserted into the at least one signal transmitter cavity of the formed sensor carrying element.

Figure 7:
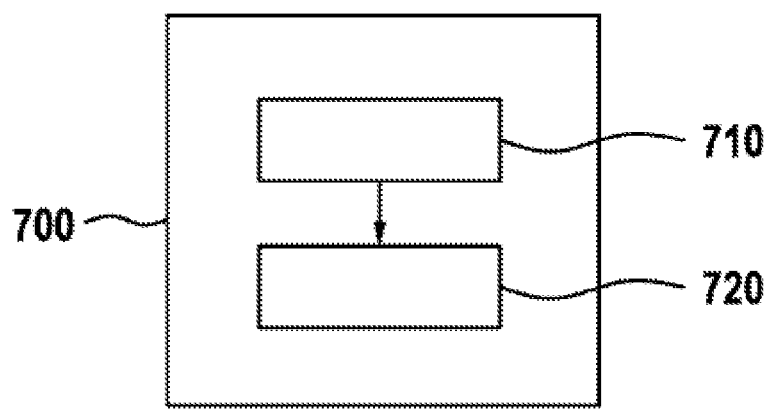
FIG. 7 a block diagram of a device for producing a sensor head device for a heart support system according to an exemplary embodiment.

FIG. 7 shows a block diagram of a device 700 for producing a sensor head device for a heart support system according to an exemplary embodiment. In this case, the device 700 is designed to carry out and/or control the steps of a method for producing a sensor head device in corresponding units.

The device 700 thus has a forming unit 710 as well as an insertion unit 720. The forming unit 710 is designed in this case to form a sensor carrying element with at least one sensor cavity for accommodating at least one sensor and/or at least one signal transmitter cavity for accommodating at least one signal transmitter in order to produce a sensor head device for a heart support system. The insertion unit 720 is lastly designed to insert at least one sensor into the at least one sensor cavity and/or at least one signal transmitter into the at least one signal transmitter cavity of the formed sensor carrying element.

If an exemplary embodiment includes an "and/or" conjunction between a first feature and a second feature, this should be read to mean that the exemplary embodiment according to one embodiment comprises both the first feature and the second feature and according to another embodiment comprises either only the first feature or only the second feature.

The invention claimed is:

1. A heart support system comprising:
   a pump configured to be delivered via a catheter to a left heart chamber to pump blood, the pump comprising:
      a guide cannula; and
      an inlet opening in a side wall of the guide cannula; and
   a sensor head device comprising a sensor carrying element, the sensor carrying element comprising:
      at least one sensor cavity configured to receive at least one sensor;
      at least one signal transmitter cavity configured to receive at least one signal transmitter; and
      a tapered cap at an outer end;
      wherein the sensor head device is positioned distal to a first end of the guide cannula and the at least one sensor cavity and the at least one signal transmitter cavity are distal to the inlet opening in the side wall of the guide cannula.

2. The heart support system according to claim 1, wherein the at least one sensor cavity is open in a different direction than the at least one signal transmitter cavity.

3. The heart support system according to claim 1, wherein the at least one sensor cavity is formed by an at least partially circumferential groove extending around the sensor carrying element.

4. The heart support system according to claim 1, wherein the sensor carrying element comprises outer walls arranged in a U-shape and/or an E-shape and/or inner walls arranged in a U-shape and/or an E-shape at at least one inner end of the sensor carrying element.

5. The heart support system according to claim 4, wherein the at least one signal transmitter cavity or the at least one sensor cavity is formed between the outer walls and/or between the outer walls and the inner walls.

6. The heart support system according to claim 1, wherein the sensor carrying element comprises a channel in a center of the sensor carrying element.

7. The heart support system according to claim 6, wherein the channel comprises a cylindrical tube.

8. The heart support system according to claim 1, further comprising:
   at least one sensor comprising a temperature sensor and/or a pressure sensor; and/or
   at least one signal transmitter comprising an ultrasound element,
      wherein the at least one sensor and/or the at least one signal transmitter is arranged on an electrical conductive element.

9. The heart support system according to claim 1, wherein the at least one signal transmitter cavity is at least partially covered by a lens element, wherein the lens element comprises an ultrasonic lens and/or a lens made of a silicone material.

10. The heart support system according to claim 1, wherein the sensor carrying element is formed from a thermoplastic and/or the sensor carrying element is manufactured in a machining manufacturing method and/or as an injection molded part.

11. The heart support system according to claim 1, wherein the at least one sensor cavity is filled with a casting compound comprising a solid or gel-like silicone or a silicone oil.

12. The heart support system according to claim 1, wherein the at least one sensor cavity is coated and/or covered by a membrane comprising a film formed of a parylene material and/or a diffusion barrier.

13. The heart support system according to claim 1, wherein the sensor head device is positioned distal to a first end of a guide cannula, wherein the sensor head device is configured to electrically connect to a back end of the heart support system positioned proximal to a second end of the guide cannula.

14. A method for producing a sensor head device for a heart support system, comprising:
   forming a sensor carrying element configured to be delivered to a heart via a catheter, the sensor carrying element comprising:
      at least one sensor cavity configured to receive at least one sensor;
      at least one signal transmitter cavity configured to receive at least one signal transmitter; and
      a tapered cap at an outer end;
      wherein the sensor head device is configured to attach to a pump, the pump comprising:
         a guide cannula; and
         an inlet opening in a side wall of the guide cannula;
      wherein the sensor head device is configured to be positioned distal to a first end of the guide cannula and the at least one sensor cavity and the at least one signal transmitter cavity are distal to the inlet opening in the side wall of the guide cannula.

15. The method according to claim 14, further comprising inserting at least one sensor into the at least one sensor cavity and/or inserting at least one signal transmitter into the at least one signal transmitter cavity of the formed sensor carrying element.

16. The method according to claim 14, wherein the at least one sensor cavity is open in a different direction than the at least one signal transmitter cavity.

17. The method according to claim 14, further comprising filling the at least one sensor cavity with a casting compound comprising a solid or gel-like silicone or a silicone oil.

18. The method according to claim 14, further comprising coating and/or covering the at least one sensor cavity by a membrane comprising a film formed of a parylene material and/or a diffusion barrier.

* * * * *